United States Patent
Gummadi et al.

(10) Patent No.: US 12,153,117 B2
(45) Date of Patent: Nov. 26, 2024

(54) DYNAMIC SENSING CONFIGURATION

(71) Applicant: QUALCOMM Incorporated, San Diego, CA (US)

(72) Inventors: Bapineedu Chowdary Gummadi, Hyderabad (IN); Stephen William Edge, Escondido, CA (US); Bala Ramasamy, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 17/658,062

(22) Filed: Apr. 5, 2022

(65) Prior Publication Data

US 2023/0314584 A1   Oct. 5, 2023

(51) Int. Cl.
  *G01S 13/00*    (2006.01)
  *G01S 7/00*     (2006.01)
  *G01S 13/86*    (2006.01)

(52) U.S. Cl.
  CPC ............ *G01S 13/003* (2013.01); *G01S 7/006* (2013.01); *G01S 13/86* (2013.01)

(58) Field of Classification Search
  None
  See application file for complete search history.

(56) References Cited

U.S. PATENT DOCUMENTS

| | | | | |
|---|---|---|---|---|
| 6,522,286 B1 * | 2/2003 | Ashihara | ............... | G01S 13/003 342/146 |
| 6,545,633 B1 * | 4/2003 | Jensen | ................. | G01S 13/003 342/134 |
| 6,653,970 B1 * | 11/2003 | Mitra | .................... | G01S 13/003 342/191 |
| 8,077,074 B2 * | 12/2011 | Venkatachalam | ..... | G01S 13/003 342/134 |
| 11,828,831 B2 * | 11/2023 | Nam | ....................... | G01S 13/86 |
| 2020/0278444 A1 | 9/2020 | Va et al. | | |

(Continued)

FOREIGN PATENT DOCUMENTS

| WO | 2021084519 A1 | 5/2021 |
|---|---|---|
| WO | 2022008064 A1 | 1/2022 |

OTHER PUBLICATIONS

Gao Y., et al., "Achieving Proportional Fairness for LTE-LAA and Wi-Fi Coexistence in Unlicensed Spectrum", IEEE Transactions on Wireless Communications, IEEE Service Center, Piscataway, NJ, US, vol. 19, No. 5, Feb. 19, 2020 (Feb. 19, 2020), pp. 3390-3404, XP011787267, ISSN: 1536-1276, DOI: 10.1109/TWC.2020. 2973145, abstract, Section I, figure 1.

(Continued)

*Primary Examiner* — Bernarr E Gregory
(74) *Attorney, Agent, or Firm* — Thien T. Nguyen

(57) ABSTRACT

Disclosed are techniques for environment sensing. In an aspect, a user equipment (UE) performs a monostatic sensing operation to detect one or more characteristics of one or more objects in an environment of the UE, transmits, to a network entity, based on detection of the one or more characteristics of the one or more objects, a request for one or more network nodes to transmit one or more wireless sensing signals to assist the UE to perform a bistatic sensing operation, and performs the bistatic sensing operation based on reception of the one or more wireless sensing signals to detect additional characteristics of the one or more objects.

74 Claims, 12 Drawing Sheets

(56) References Cited

U.S. PATENT DOCUMENTS

2020/0371220 A1 11/2020 Eitan et al.
2021/0076367 A1 3/2021 Bayesteh et al.
2021/0349199 A1 11/2021 Trainin et al.

OTHER PUBLICATIONS

Hammou D., et al., "I/Q Multiport Sensing Feasibility on Ambient Wireless Energy", 2018 IEEE Wireless Power Transfer Conference (WPTC), IEEE, Jun. 3, 2018 (Jun. 3, 2018), pp. 1-3, XP033517555, DOI: 10.1109/WPT.2018.8639298, abstract, Section I, figure 1.
International Search Report and Written Opinion—PCT/US2023/061798—ISA/EPO—Apr. 13, 2023.
Kasher (Qualcomm) A., "DMG Sensing Capabilities Element", PDT-DMG-Sensing-Capability, IEEE Draft, IEEE 802.11-22/0240r1, 11-22-0240-01-00BF-PDT-DMG-Sensing-Capability, IEEE-SA Mentor, Piscataway, NJ, USA, vol. 802.11bf, No. 1, Feb. 15, 2022, pp. 1-6, 20220125, XP068189046, the whole document.
Silva (Meta Platforms) C.D., et al., "Specification Framework for TGbf", IEEE Draft, IEEE 802.11-21/0504r7, 11-21-0504-07-00BF-Specification-Framework-For-TGBF, IEEE-SA Mentor, Piscataway, NJ, USA, vol. 802.11bf, No. 7, Jan. 24, 2022 (Jan 24, 2022), pp. 1-21, XP068188659, Sections "7.2 Sensing by proxy (SBP) procedure" and "7.3 DMG Sensing (SENS) procedure" (complete).
Trainin (Qualcomm) S., et al., "Proposed Draft Text for DMG Sensing Procedure", IEEE Draft, IEEE 802.11-22/0243r6, 11-22-0243-06-00BF-PDT-DMG-Sensing-Procedure, IEEE-SA Mentor, Piscataway, NJ, USA, vol. 802.11bf, No. 6, Feb. 24, 2022, pp. 1-15, Jan. 24, 2022, XP068189135, Section 11.21.18.x DMG sensing (SENS) procedure (complete).

* cited by examiner

DYNAMIC SENSING CONFIGURATION

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of environment sensing performed by a user equipment (UE) includes performing a monostatic sensing operation to detect one or more characteristics of one or more objects in an environment of the UE; transmitting, to a network entity, based on detection of the one or more characteristics of the one or more objects, a request for one or more network nodes to transmit one or more wireless sensing signals to assist the UE to perform a bistatic sensing operation; and performing the bistatic sensing operation based on reception of the one or more wireless sensing signals to detect additional characteristics of the one or more objects.

In an aspect, a method of environment sensing performed by a user equipment (UE) includes performing a monostatic sensing operation to detect one or more characteristics of an environment of the UE, one or more objects in the environment of the UE, or both; transmitting one or more parameters for a bistatic sensing operation to a network entity, the one or more parameters determined based, at least in part, on the one or more characteristics of the environment, the one or more objects, or both; and performing the bistatic sensing operation based on reception of one or more wireless sensing signals transmitted by one or more network nodes, the one or more wireless sensing signals configured based on the one or more parameters.

In an aspect, a method of environment sensing performed by a user equipment (UE) includes performing a monostatic sensing operation to determine at least one direction of interest for a bistatic sensing operation; transmitting, to a network entity, a request for one or more network nodes to transmit one or more wireless sensing signals based on the at least one direction of interest to assist the UE to perform the bistatic sensing operation; and performing the bistatic sensing operation based on reception of the one or more wireless sensing signals that are transmitted based on the at least one direction of interest.

In an aspect, a user equipment (UE) includes a memory; at least one transceiver; and at least one processor communicatively coupled to the memory and the at least one transceiver, the at least one processor configured to: perform a monostatic sensing operation to detect one or more characteristics of one or more objects in an environment of the UE; transmit, via the at least one transceiver, to a network entity, based on detection of the one or more characteristics of the one or more objects, a request for one or more network nodes to transmit one or more wireless sensing signals to assist the UE to perform a bistatic sensing operation; and perform the bistatic sensing operation based on reception of the one or more wireless sensing signals to detect additional characteristics of the one or more objects.

In an aspect, a user equipment (UE) includes a memory; at least one transceiver; and at least one processor communicatively coupled to the memory and the at least one transceiver, the at least one processor configured to: perform a monostatic sensing operation to detect one or more characteristics of an environment of the UE, one or more objects in the environment of the UE, or both; transmit, via the at least one transceiver, one or more parameters for a bistatic sensing operation to a network entity, the one or more parameters determined based, at least in part, on the one or more characteristics of the environment, the one or more objects, or both; and perform the bistatic sensing operation based on reception of one or more wireless sensing signals transmitted by one or more network nodes, the one or more wireless sensing signals configured based on the one or more parameters.

In an aspect, a user equipment (UE) includes a memory; at least one transceiver; and at least one processor communicatively coupled to the memory and the at least one transceiver, the at least one processor configured to: perform a monostatic sensing operation to determine at least one direction of interest for a bistatic sensing operation; transmit, via the at least one transceiver, to a network entity, a request for one or more network nodes to transmit one or more wireless sensing signals based on the at least one direction of interest to assist the UE to perform the bistatic sensing operation; and perform the bistatic sensing operation based on reception of the one or more wireless sensing signals that are transmitted based on the at least one direction of interest.

In an aspect, a user equipment (UE) includes means for performing a monostatic sensing operation to detect one or more characteristics of one or more objects in an environment of the UE; means for transmitting, to a network entity, based on detection of the one or more characteristics of the one or more objects, a request for one or more network nodes to transmit one or more wireless sensing signals to assist the UE to perform a bistatic sensing operation; and means for performing the bistatic sensing operation based on reception of the one or more wireless sensing signals to detect additional characteristics of the one or more objects.

In an aspect, a user equipment (UE) includes means for performing a monostatic sensing operation to detect one or more characteristics of an environment of the UE, one or more objects in the environment of the UE, or both; means for transmitting one or more parameters for a bistatic sensing operation to a network entity, the one or more parameters determined based, at least in part, on the one or more characteristics of the environment, the one or more objects, or both; and means for performing the bistatic sensing operation based on reception of one or more wireless sensing signals transmitted by one or more network nodes, the one or more wireless sensing signals configured based on the one or more parameters.

In an aspect, a user equipment (UE) includes means for performing a monostatic sensing operation to determine at least one direction of interest for a bistatic sensing operation; means for transmitting, to a network entity, a request for one or more network nodes to transmit one or more wireless sensing signals based on the at least one direction of interest to assist the UE to perform the bistatic sensing operation; and means for performing the bistatic sensing operation based on reception of the one or more wireless sensing signals that are transmitted based on the at least one direction of interest.

In an aspect, a non-transitory computer-readable medium stores computer-executable instructions that, when executed by a user equipment (UE), cause the UE to: perform a monostatic sensing operation to detect one or more characteristics of one or more objects in an environment of the UE; transmit, to a network entity, based on detection of the one or more characteristics of the one or more objects, a request for one or more network nodes to transmit one or more wireless sensing signals to assist the UE to perform a bistatic sensing operation; and perform the bistatic sensing operation based on reception of the one or more wireless sensing signals to detect additional characteristics of the one or more objects.

In an aspect, a non-transitory computer-readable medium stores computer-executable instructions that, when executed by a user equipment (UE), cause the UE to: perform a monostatic sensing operation to detect one or more characteristics of an environment of the UE, one or more objects in the environment of the UE, or both; transmit one or more parameters for a bistatic sensing operation to a network entity, the one or more parameters determined based, at least in part, on the one or more characteristics of the environment, the one or more objects, or both; and perform the bistatic sensing operation based on reception of one or more wireless sensing signals transmitted by one or more network nodes, the one or more wireless sensing signals configured based on the one or more parameters.

In an aspect, a non-transitory computer-readable medium stores computer-executable instructions that, when executed by a user equipment (UE), cause the UE to: perform a monostatic sensing operation to determine at least one direction of interest for a bistatic sensing operation; transmit, to a network entity, a request for one or more network nodes to transmit one or more wireless sensing signals based on the at least one direction of interest to assist the UE to perform the bistatic sensing operation; and perform the bistatic sensing operation based on reception of the one or more wireless sensing signals that are transmitted based on the at least one direction of interest.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
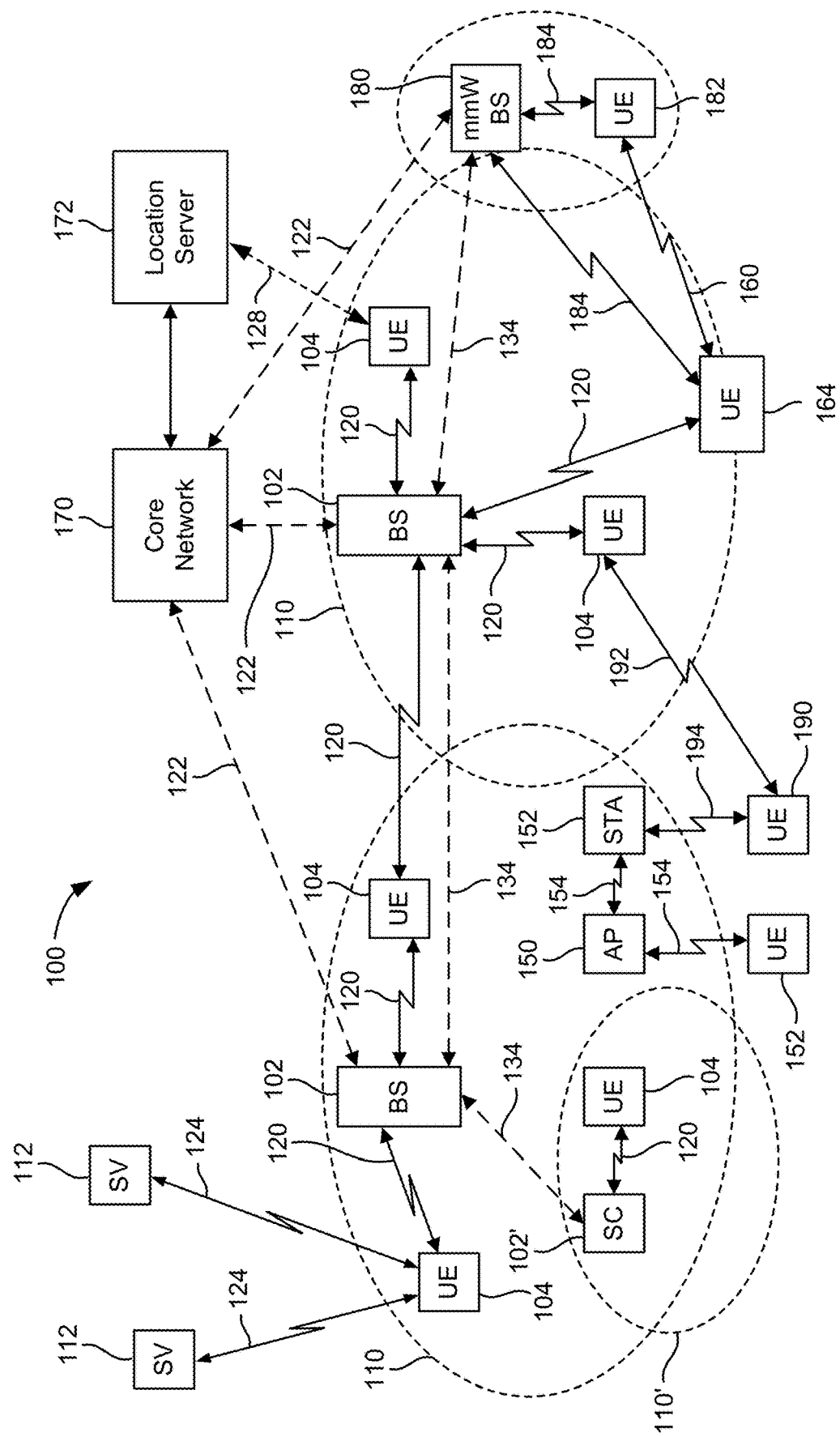
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more S Cells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
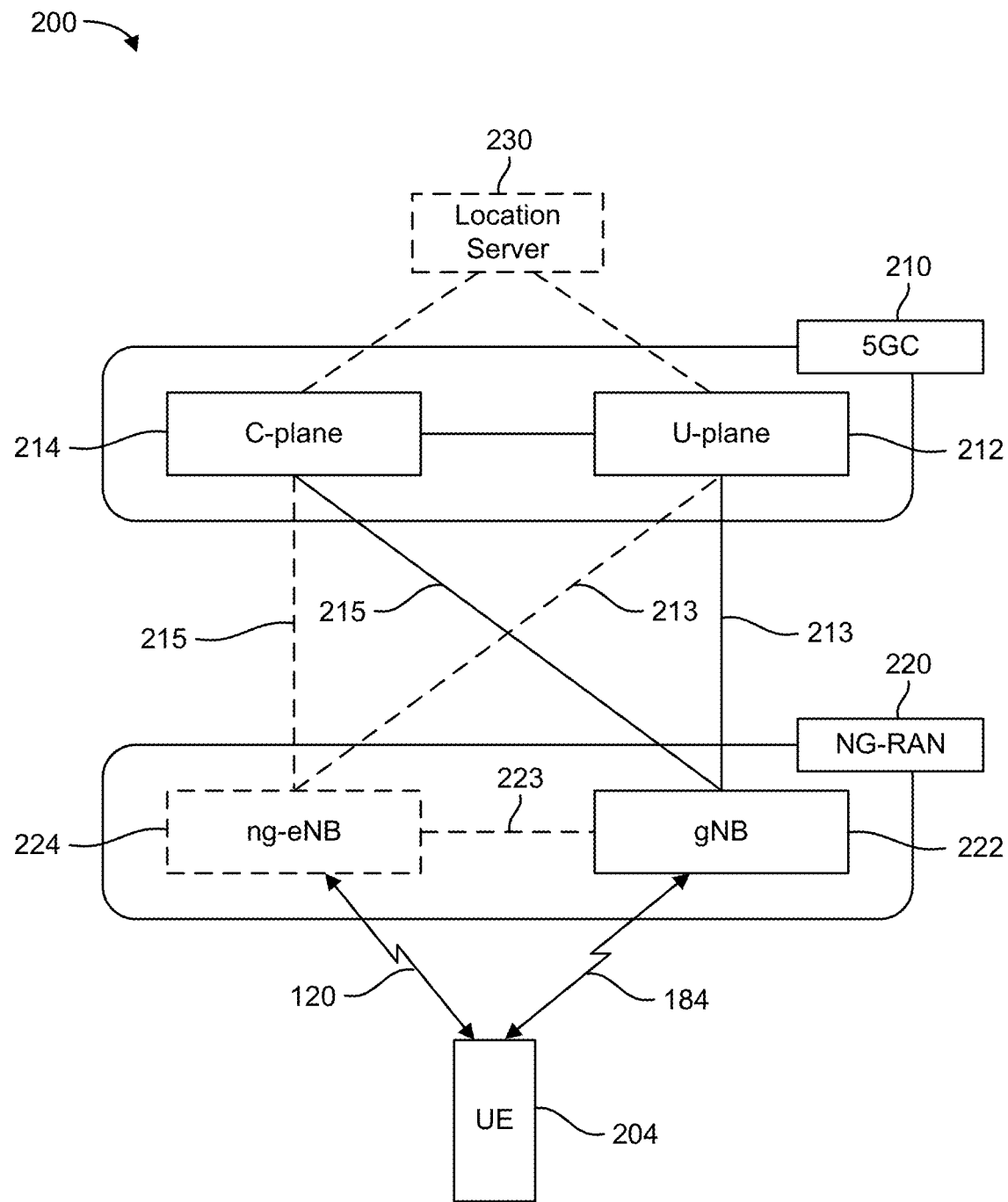
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
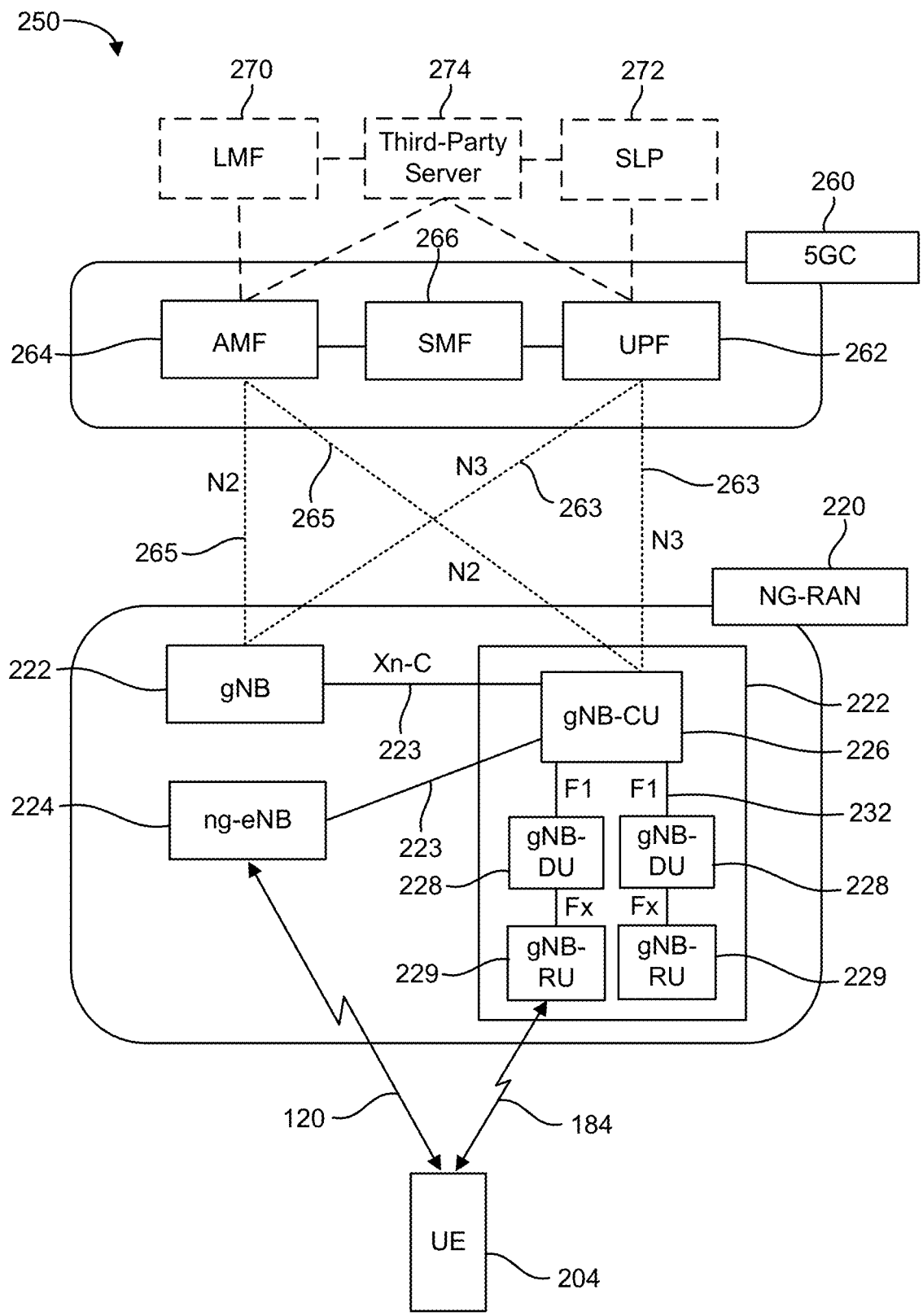

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
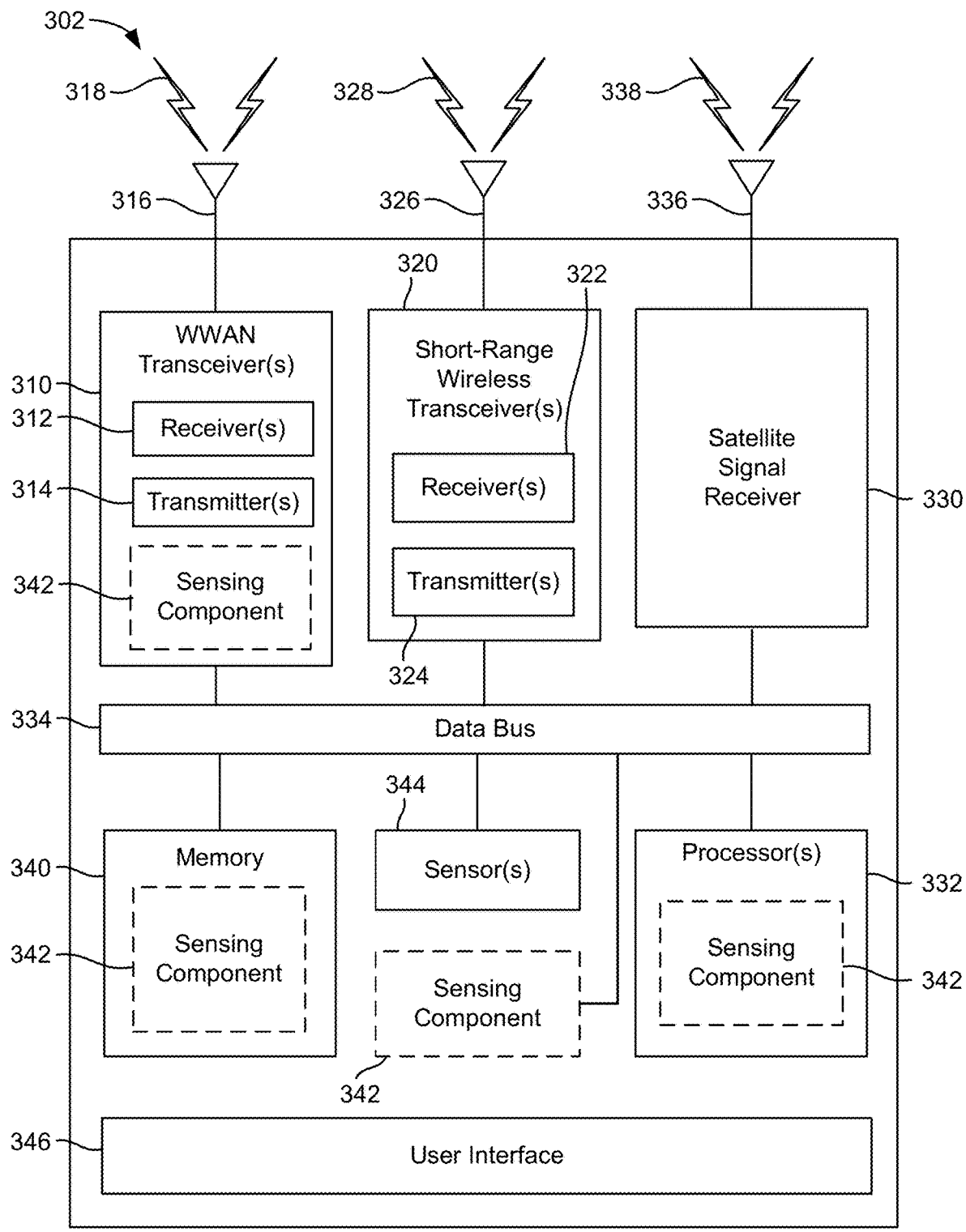
FIGS. 3A, 3B, and 3C are simplified block diagrams of several sample aspects of components that may be employed in a user equipment (UE), a base station, and a network entity, respectively, and configured to support communications as taught herein.
Figure 3B:
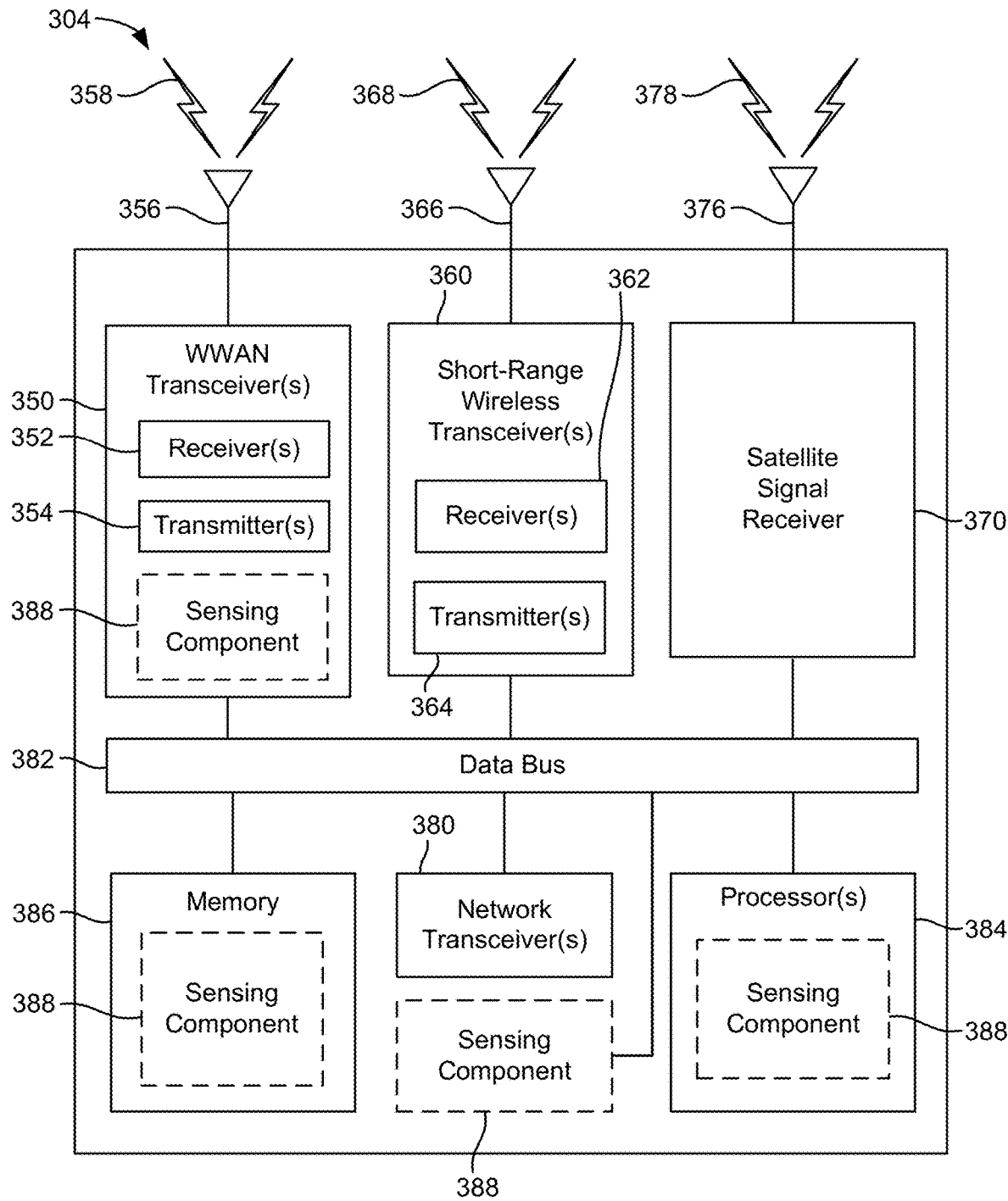
Figure 3C:
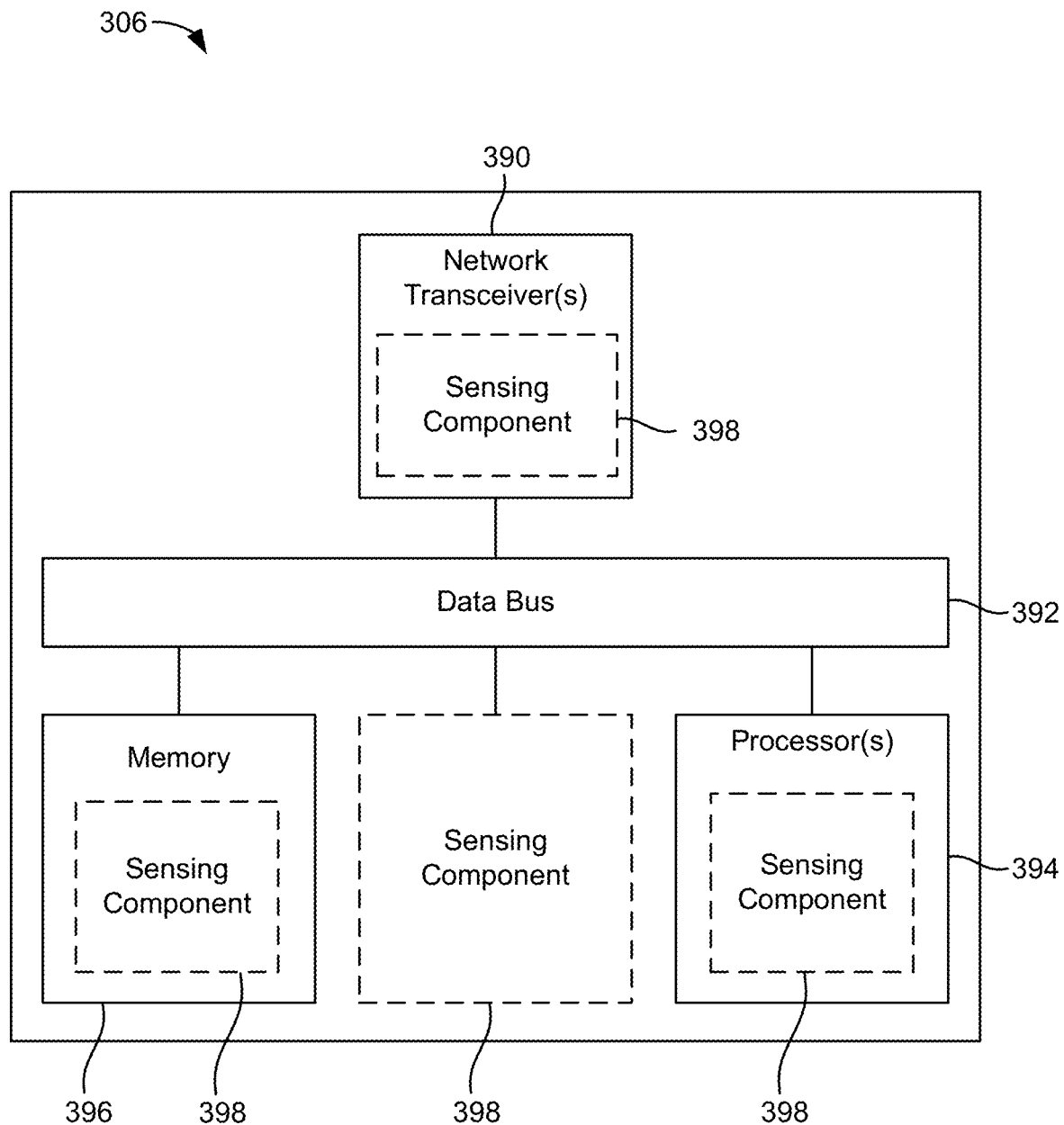

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350 (e.g., cellular network transceivers), respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and soon), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include sensing component 342, 388, and 398, respectively. The sensing component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the sensing component 342, 388, and 398 may be external to the processors 332, 384, and 394 (e.g., part of a modem processing system, integrated with another processing system, etc.). Alternatively, the sensing component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the sensing component 342, which may be, for example, part of the one or more WWAN transceivers 310, the memory 340, the one or more processors 332, or any combination thereof, or may be a standalone component. FIG. 3B illustrates possible locations of the sensing component 388, which may be, for example, part of the one or more WWAN transceivers 350, the memory 386, the one or more processors 384, or any combination thereof, or may be a standalone component. FIG. 3C illustrates possible locations of the sensing component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the sensing component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Wireless communication signals (e.g., RF signals configured to carry OFDM symbols in accordance with a wireless communications standard, such as LTE, NR, etc.) transmitted between a UE and a base station can be used for environment sensing (also referred to as "RF sensing" or "radar"). Using wireless communication signals for environment sensing can be regarded as consumer-level radar with advanced detection capabilities that enable, among other things, touchless/device-free interaction with a device/system. The wireless communication signals may be cellular communication signals, such as LTE or NR signals, WLAN signals, such as Wi-Fi signals, etc. As a particular example, the wireless communication signals may be an OFDM waveform as utilized in LTE and NR. High-frequency communication signals, such as mmW RF signals, are especially beneficial to use as radar signals because the higher frequency provides, at least, more accurate range (distance) detection.

Possible use cases of RF sensing include health monitoring use cases, such as heartbeat detection, respiration rate monitoring, and the like, gesture recognition use cases, such as human activity recognition, keystroke detection, sign language recognition, and the like, contextual information acquisition use cases, such as location detection/tracking, direction finding, range estimation, and the like, and automotive radar use cases, such as smart cruise control, collision avoidance, and the like.

Figure 4A:
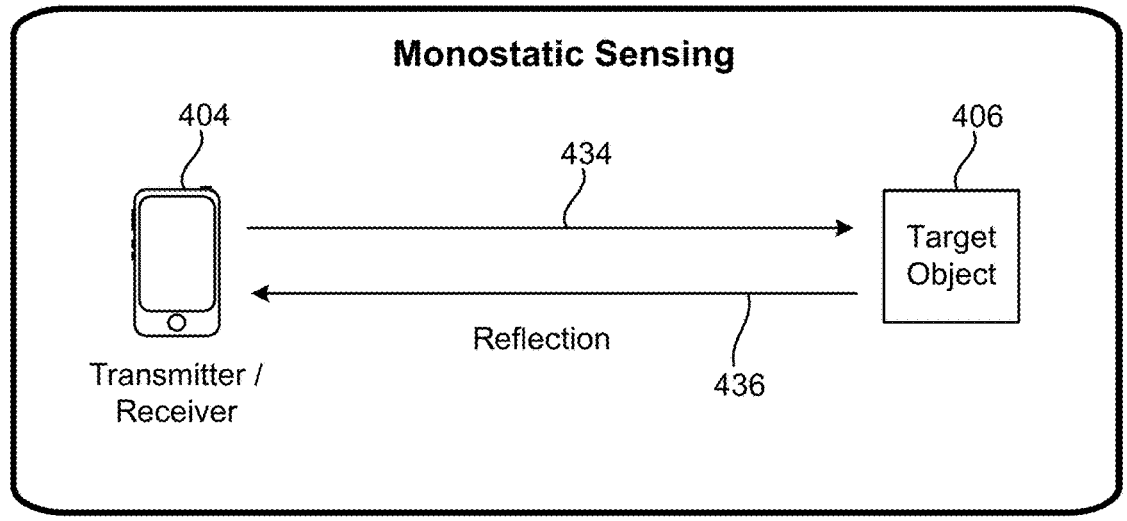
FIGS. 4A and 4B illustrate different types of radar.
Figure 4B:
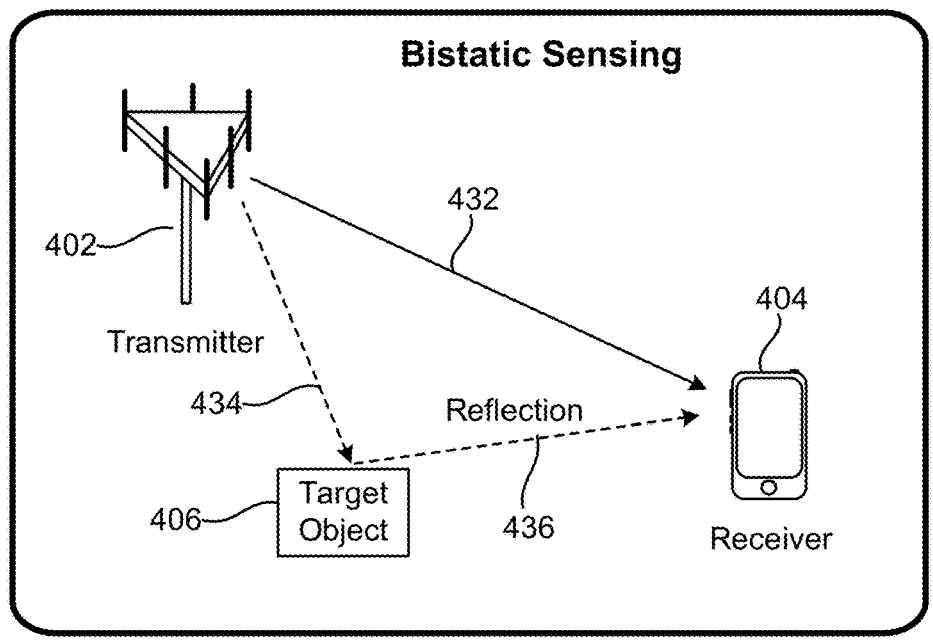

There are different types of sensing, including monostatic sensing (also referred to as "active sensing") and bistatic sensing (also referred to as "passive sensing"). FIGS. 4A and 4B illustrate these different types of sensing. Specifically, FIG. 4A is a diagram 400 illustrating a monostatic sensing scenario and FIG. 4B is a diagram 430 illustrating a bistatic sensing scenario. In FIG. 4A, the transmitter (Tx) and receiver (Rx) are co-located in the same device 404 (e.g., a UE). The sensing device 404 transmits one or more RF sensing signals 434 (e.g., uplink or sidelink positioning reference signals (PRS) where the device 404 is a UE), and some of the RF sensing signals 434 reflect off a target object 406. The sensing device 404 can measure various properties (e.g., times of arrival (ToAs), angles of arrival (AoAs), phase shift, etc.) of the reflections 436 of the RF sensing signals 434 to determine characteristics of the target object 406 (e.g., size, shape, speed, motion state, etc.).

Wi-Fi sensing is a type of monostatic sensing that is being integrated into more and more Wi-Fi chipsets (referred to as "channel capture"). Wi-Fi sensing can use mmW signals in the 60 GHz frequency range (although it is not limited to this frequency range) and can sense the surrounding environment and estimate the location, orientation, and dimensions of any nearby reflectors (e.g., walls, furniture, human body parts, etc.). Wi-Fi sensing can "see" through walls, generate 3D indoor maps, and sense both LOS and NLOS environments. Since Wi-Fi chipsets are already present in many devices, no additional hardware is needed to perform Wi-Fi sensing.

In FIG. 4B, the transmitter (Tx) and receiver (Rx) are not co-located, that is, they are separate devices (e.g., a UE and a base station). Note that while FIG. 4B illustrates using a downlink RF signal as the RF sensing signal 432, uplink RF signals or sidelink RF signals can also be used as RF sensing signals 432. In a downlink scenario, as shown, the transmitter is a base station and the receiver is a UE, whereas in an uplink scenario, the transmitter is a UE and the receiver is a base station.

Referring to FIG. 4B in greater detail, the transmitter device 402 transmits RF sensing signals 432 and 434 (e.g., positioning reference signals (PRS)) to the receiver device 404, but some of the RF sensing signals 434 reflect off a target object 406. The receiver device 404 (also referred to as the "sensing device") can measure the times of arrival (ToAs) of the RF sensing signals 432 received directly from the transmitter device and the ToAs of the reflections 436 of the RF sensing signals 434 reflected from the target object 406.

More specifically, as described above, a transmitter device (e.g., a base station) may transmit a single RF signal or multiple RF signals to a receiver device (e.g., a UE). However, the receiver may receive multiple RF signals corresponding to each transmitted RF signal due to the propagation characteristics of RF signals through multipath channels. Each path may be associated with a cluster of one or more channel taps. Generally, the time at which the receiver detects the first cluster of channel taps is considered the ToA of the RF signal on the line-of-site (LOS) path (i.e., the shortest path between the transmitter and the receiver). Later clusters of channel taps are considered to have reflected off objects between the transmitter and the receiver and therefore to have followed non-LOS (NLOS) paths between the transmitter and the receiver.

Thus, referring back to FIG. 4B, the RF sensing signals 432 followed the LOS path between the transmitter device 402 and the receiver device 404, and the RF sensing signals 434 followed an NLOS path between the transmitter device 402 and the receiver device 404 due to reflecting off the target object 406. The transmitter device 402 may have transmitted multiple RF sensing signals 432, 434, some of which followed the LOS path and others of which followed the NLOS path. Alternatively, the transmitter device 402 may have transmitted a single RF sensing signal in a broad enough beam that a portion of the RF sensing signal followed the LOS path (RF sensing signal 432) and a portion of the RF sensing signal followed the NLOS path (RF sensing signal 434).

Based on the ToA of the LOS path, the ToA of the NLOS path, and the speed of light, the receiver device can determine the distance to the target object(s). For example, the receiver device can calculate the distance to the target object as the difference between the ToA of the LOS path and the ToA of the NLOS path multiplied by the speed of light. In addition, if the receiver device is capable of receive beamforming, the receiver device may be able to determine the general direction to a target object as the direction (angle) of the receive beam on which the RF sensing signal following the NLOS path was received. That is, the receiver device may determine the direction to the target object as the angle of arrival (AoA) of the RF sensing signal, which is the angle of the receive beam used to receive the RF sensing signal. The receiver device may then optionally report this information to the transmitter device, its serving base station, an application server associated with the core network, an external client, a third-party application, or some other sensing entity. Alternatively, the receiver device may report the ToA measurements to the transmitter device, or other sensing entity (e.g., if the receiver device does not have the processing capability to perform the calculations itself), and the transmitter device may determine the distance and, optionally, the direction to the target object.

Note that if the RF sensing signals are uplink RF signals transmitted by a UE to a base station, the base station would perform object detection based on the uplink RF signals just like the UE does based on the downlink RF signals.

Like conventional radar, wireless communication-based radar signal can be used to estimate the range (distance), velocity (Doppler), and angle (AoA) of a target object. However, the performance (e.g., resolution and maximum values of range, velocity, and angle) may depend on the design of the reference signal.

Figure 5:
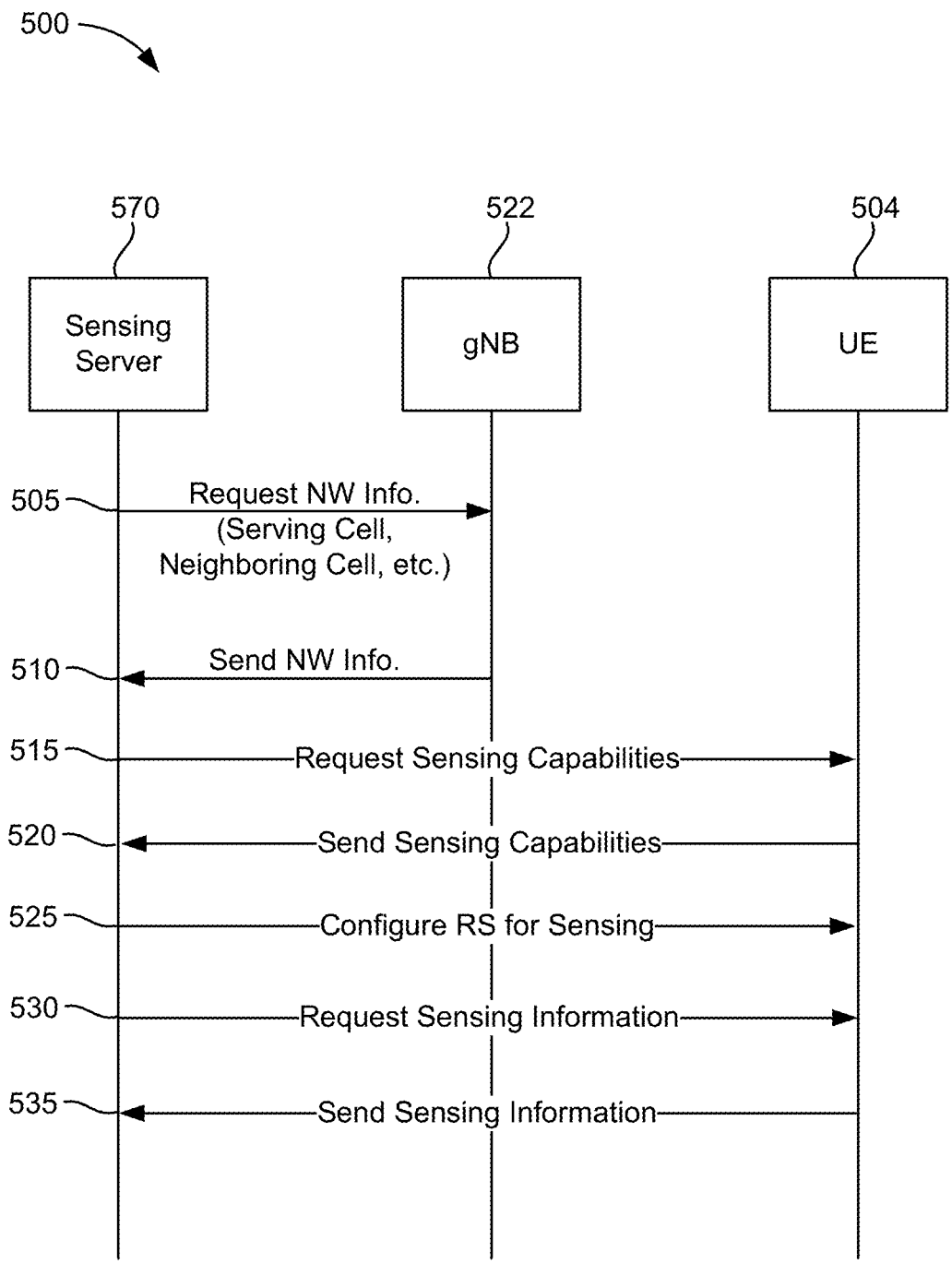
FIG. 5 illustrates an example call flow for a New Radio (NR)-based sensing procedure in which the network configures the sensing parameters, according to aspects of the disclosure.

FIG. 5 illustrates an example call flow 500 for an NR-based sensing procedure (i.e., a bistatic sensing procedure) in which the network configures the sensing parameters, according to aspects of the disclosure. Although FIG. 5 illustrates a network-coordinated sensing procedure, the sensing procedure could be coordinated over sidelink channels.

At stage 505, a sensing server 570 (e.g., inside or outside the core network) sends a request for network (NW) information to a gNB 522 (e.g., the serving gNB of a UE 504). The request may be for a list of the UE's 504 serving cell and any neighboring cells. At stage 510, the gNB 522 sends the requested information to the sensing server 570. At stage 515, the sensing server 570 sends a request for sensing capabilities to the UE 504. At stage 520, the UE 504 provides its sensing capabilities to the sensing server 570. At stage 525, the sensing server 570 sends a configuration to the UE 504 indicating the reference signals (RS) that will be transmitted for sensing. The reference signals for sensing may be transmitted by the serving and/or neighboring cells identified at stage 510. At stage 530, the sensing server 570 sends a request for sensing information to the UE 504. The UE 504 then measures the transmitted reference signals and, at stage 535, sends the measurements, or any sensing results determined from the measurements, to the sensing server 570.

In an aspect, the communication between the UE 504 and the sensing server 570 may be via the LTE positioning protocol (LPP). The communication between the sensing server 570 and the gNB may be via NR positioning protocol type A (NRPPa).

Monostatic (active) sensing (e.g., where the UE transmits and receives the sensing signal(s)) has various limitations compared to bistatic sensing. As an example, monostatic sensing may not be possible to determine certain characteristics of a target object (e.g., a human, a vehicle, a factory automation robot, a shipping container, a piece of furniture, etc.), and instead, multi-hop sensing (as in the case of bistatic sensing) may be needed. For example, a sensing device using monostatic sensing can only detect features of one side of a target object. As such, where the target object is a human (e.g., an intruder), for example, the sensing device will not be able to detect the face of the human if the human is facing away from the sensing device.

As another example, due to power restrictions, the distance over which a sensing device can use active sensing may be limited. As such, it may not be practical to rely only on monostatic sensing, especially if the target region or object of interest is outside the sensing range of the sensing device. As yet another example, there may be a requirement that the sensing be more accurate in a particular region and/or direction, which may not be possible using monostatic sensing (e.g., due to limitations of the sensing device). As such, it would be beneficial to enable a sensing device to switch between monostatic and bistatic sensing based on the sensing scenario.

The present disclosure provides various techniques for switching between monostatic and bistatic sensing. In some cases, the required sensing range may be beyond the capabilities of monostatic sensing (e.g., Wi-Fi sensing) for various reasons, such as higher attenuation of the sensing signals, dense surroundings, high required range of the sensing, etc. In such cases, the present disclosure provides techniques to use both monostatic sensing and bistatic sensing (e.g., NR-based sensing) to obtain a map of a larger area than could be obtained from monostatic sensing alone. In greater detail, monostatic sensing (e.g., Wi-Fi sensing) is traditionally used with a maximum permissible power to cover the maximum area possible, but is still limited by regulatory requirements and the transmission power capabilities of the sensing device (e.g., a UE). However, in the case of bistatic sensing (e.g., NR-based sensing), the UE can request a gNB (e.g., gNB 522) or a sensing server (e.g., sensing server 570) to configure sensing reference signals to be transmitted towards or from a particular direction in which the UE is interested, thereby extending the range of the sensing. In an aspect, the UE may, but need not, send a request for the switch from monostatic to bistatic sensing, and there may or may not be an explicit switchover.

Additionally, the UE can perform simultaneous sensing procedures (i.e., sensing operations) using multiple sources (e.g., monostatic and bistatic). The UE (or sensing server) can then combine the information from each source to improve an image or determination of an object. Alternatively, the UE can select just one sensing source or a subset of available sensing sources based on the environment conditions (e.g., attenuation, density of surroundings, required range, etc.).

In some cases, bistatic sensing (e.g., NR-based sensing requested by the UE or initiated by the network) can be configured based on more specific information than monostatic sensing, such as the direction of interest of the sensing device (e.g., the direction towards a detected object). As such, the present disclosure provides techniques for the sensing device (e.g., a UE) to indicate the direction in which it is interested in sensing. For example, if the UE is interested in sensing in all directions, it can indicate that it is interested in omni-directional sensing. Otherwise, the UE can indicate that it is interested in a specific direction. The network can then configure the sensing procedure using sidelink reference signals and/or downlink reference signals based on the direction requested from the UE. For example, if the UE is requesting to perform sensing only in a specific direction, the network (e.g., sensing server 570, gNB 522) can configure only certain gNBs and/or certain sidelink UEs to transmit reference signals based on that direction. Or, if the UE is requesting to perform sensing in multiple directions (e.g., omni-directionally), the network can configure multiple gNBs and/or sidelink UEs to transmit sensing reference signals based on the multiple directions. For example, referring to FIG. 4B, if the receiver 404 determines the direction to the target object 406 (e.g., using monostatic sensing), it can indicate that direction (i.e., the direction of interest) to the transmitter 402. The transmitter 402 can then transmit sensing signals (e.g., RF sensing signals 434) in a direction towards and/or intersecting the direction of interest (i.e., the direction of transmission).

The present disclosure also provides techniques for dynamically varying the type of sensing based on the movement and/or change in direction of a detected target. For example, if the target is moving away from the sensing device (e.g., a UE), or if the target rotates or turns away from the UE, then the UE can request the sensing to change from monostatic to bistatic. As an example, if the target is a person and the person turns their head away from the UE, then the UE can request the sensing to change from monostatic to bistatic. Bistatic sensing with assistance from the network (e.g., sensing server 570, gNB 522) can thereby be enabled and/or disabled in real time ("on the fly").

A UE can request this dynamic sensing switching through radio resource control (RRC) signaling, a MAC control element (MAC-CE), or a special uplink control information (UCI) message. The request may be to enable or disable sensing reference signal transmission for bistatic sensing.

The sensing signal may be a cell-specific reference signal (CRS) from a gNB (e.g., a downlink PRS or some other CRS), or a sounding reference signal (SRS) or a sidelink PRS (SL-PRS) from another UE. Alternatively, the sensing signal may be a reference signal specifically designed for sensing.

In an aspect, bistatic sensing may also be performed by the sensing device (e.g., a UE) alone without assistance from the network. For example, the sensing device may request other devices in the vicinity to transmit sensing signals. The request may be transmitted using D2D protocols such as Bluetooth, Wi-Fi-Direct, NR sidelink, etc. The request may indicate a specific direction in which the sensing device is interested, a specific configuration of the sensing signals, and/or the like, similar to a request to the network.

The present disclosure further provides techniques for calibration of bistatic sensing using monostatic sensing and/or preconfigured data. In an aspect, the sensing device (e.g., a UE) may determine characteristics of objects or environments using monostatic sensing (e.g., Wi-Fi sensing) and then use these to calibrate (e.g., determine) parameters for bistatic sensing (e.g., NR-based sensing). For example, the parameters may include a direction from the UE to the target object, an estimated location of the target object, a frequency range for the sensing signals to be transmitted, a periodicity of the sensing signals to be transmitted, a transmit power level of the sensing signals, and/or the like. The monostatic and bistatic sensing may be performed simultaneously or serially, depending on the requirements of the sensing and/or the capabilities of the sensing device. The sensing device may also, or alternatively, use known preconfigured characteristics of objects or environments (e.g., from a building plan, street map, etc.) to calibrate parameters for a subsequent bistatic sensing procedure.

Note that while the foregoing has generally described the monostatic sensing as Wi-Fi sensing and the bistatic sensing as NR sensing, as will be appreciated, the monostatic sensing and the bistatic sensing may use other technologies, or even the same technology with different parameters (e.g., different reference signal configurations, different transmit powers, different periodicities, etc.).

Figure 6:
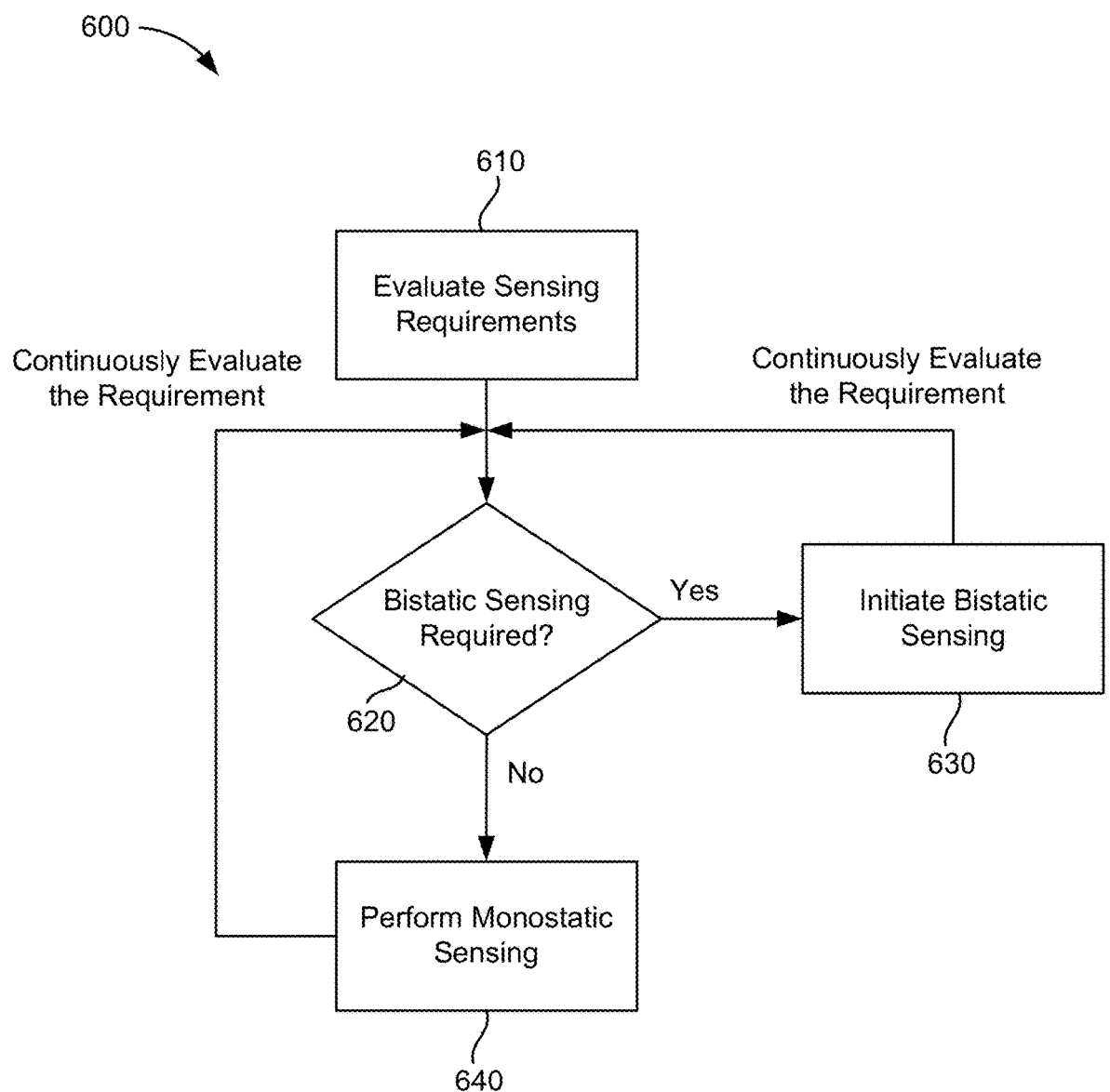
FIG. 6 illustrates an example method for dynamically switching between monostatic and bistatic sensing, according to aspects of the disclosure.

FIG. 6 illustrates an example method 600 for dynamically switching between monostatic and bistatic sensing, according to aspects of the disclosure. The method 600 may be performed by a sensing device, such as a UE.

At stage 610, the sensing device evaluates the current sensing requirements, such as the attenuation of reflected sensing signals, the density of the sensing device's surroundings, the required range of the sensing, the motion or movement of a target object, a direction in which the sensing device is interested in sensing, and the like. In an aspect, operation 610 may be performed by the one or more WWAN transceivers 310, the one or more short-range wireless transceivers 320, the one or more processors 332, memory 340, and/or positioning component 342, any or all of which may be considered means for performing this operation.

At stage 620, the sensing device determines whether bistatic sensing (e.g., NR sensing) is required based on the evaluated sensing requirements. In an aspect, operation 620 may be performed by the one or more WWAN transceivers 310, the one or more short-range wireless transceivers 320, the one or more processors 332, memory 340, and/or positioning component 342, any or all of which may be considered means for performing this operation.

At stage 630, if bistatic sensing is required, the sensing device initiates bistatic sensing (i.e., a bistatic sensing operation) with the network or nearby UEs. The sensing device then continues to evaluate the sensing requirements. In an aspect, operation 630 may be performed by the one or more WWAN transceivers 310, the one or more short-range wireless transceivers 320, the one or more processors 332, memory 340, and/or positioning component 342, any or all of which may be considered means for performing this operation.

At stage 640, if bistatic sensing is not required, the sensing device performs monostatic sensing (i.e., a monostatic sensing operation). The sensing device then continues to evaluate the sensing requirements. In an aspect, operation 640 may be performed by the one or more WWAN transceivers 310, the one or more short-range wireless transceivers 320, the one or more processors 332, memory 340, and/or positioning component 342, any or all of which may be considered means for performing this operation.

Figure 7:
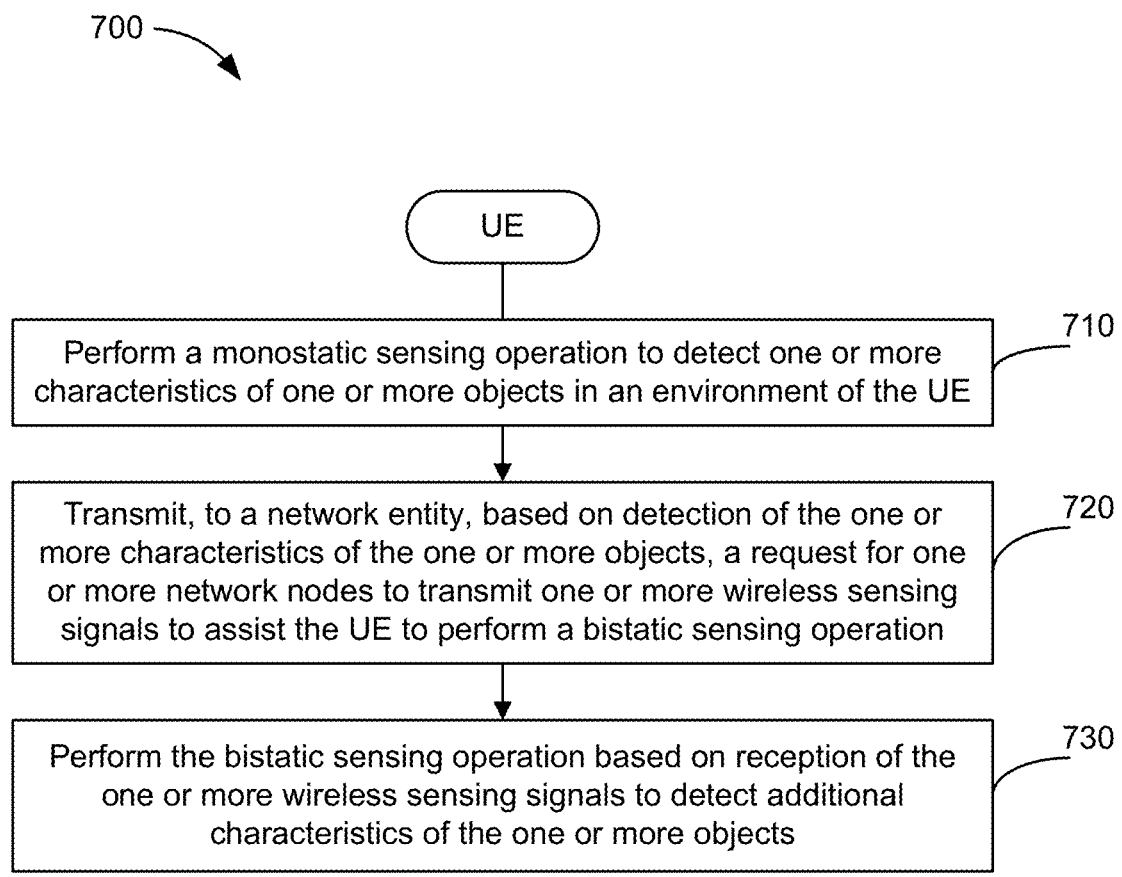
FIGS. 7 to 9 illustrate example methods of environment sensing, according to aspects of the disclosure.

FIG. 7 illustrates an example method 700 of environment sensing, according to aspects of the disclosure. In an aspect, method 700 may be performed by a UE (e.g., any of the UEs described herein).

At 710, the UE performs a monostatic sensing operation (procedure) to detect one or more characteristics of one or more objects in an environment of the UE. In an aspect, the one or more characteristics of the one or more objects may comprise a motion state of the one or more objects, an orientation of the one or more objects, a speed of the one or more objects, a direction of movement of the one or more objects, a number of the one or more objects, or any combination thereof. In an aspect, operation 710 may be performed by the one or more WWAN transceivers 310, the one or more short-range wireless transceivers 320, the one or more processors 332, memory 340, and/or positioning component 342, any or all of which may be considered means for performing this operation.

At 720, the UE transmits, to a network entity (e.g., a sensing server, a base station, a UE), based on detection of the one or more characteristics of the one or more objects, a request for one or more network nodes (e.g., one or more base stations, one or more UEs, or a combination thereof) to transmit one or more wireless sensing signals to assist the UE to perform a bistatic sensing operation (procedure). In an aspect, operation 720 may be performed by the one or more WWAN transceivers 310, the one or more short-range wireless transceivers 320, the one or more processors 332, memory 340, and/or positioning component 342, any or all of which may be considered means for performing this operation.

At 730, the UE performs the bistatic sensing operation based on reception of the one or more wireless sensing signals to detect additional characteristics of the one or more objects. In an aspect, the additional characteristics of the one or more objects may comprise more detailed values for the one or more characteristics of the one or more objects than values of the one or more characteristics of the one or more objects determined from the monostatic sensing operation. In an aspect, operation 730 may be performed by the one or more WWAN transceivers 310, the one or more short-range wireless transceivers 320, the one or more processors 332, memory 340, and/or positioning component 342, any or all of which may be considered means for performing this operation. In an aspect, the bistatic sensing operation may be performed with the same or different transceiver of the one or more WWAN transceivers 310 and/or the one or more short-range wireless transceivers 320 than performed the monostatic sensing operation.

Figure 8:
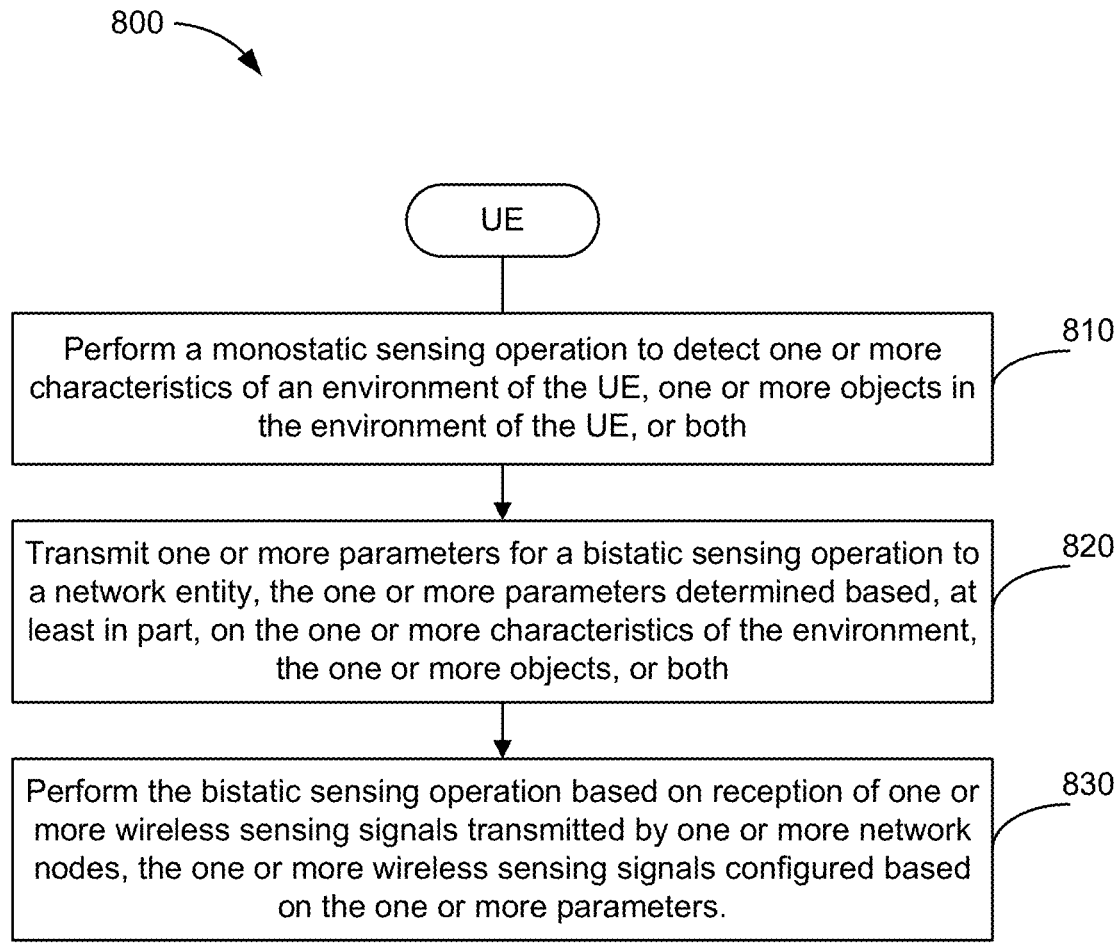

FIG. 8 illustrates an example method 800 of environment sensing, according to aspects of the disclosure. In an aspect, method 800 may be performed by a UE (e.g., any of the UEs described herein).

At 810, the UE performs a monostatic sensing operation to detect one or more characteristics of an environment of the UE, one or more objects in the environment of the UE, or both. In an aspect, operation 810 may be performed by the one or more WWAN transceivers 310, the one or more short-range wireless transceivers 320, the one or more processors 332, memory 340, and/or positioning component 342, any or all of which may be considered means for performing this operation.

At 820, the UE transmits one or more parameters for a bistatic sensing operation to a network entity (e.g., a sensing server, a base station, a UE), the one or more parameters determined based, at least in part, on the one or more characteristics of the environment, the one or more objects, or both. In an aspect, operation 820 may be performed by the one or more WWAN transceivers 310, the one or more short-range wireless transceivers 320, the one or more processors 332, memory 340, and/or positioning component 342, any or all of which may be considered means for performing this operation.

At 830, the UE performs the bistatic sensing operation based on reception of one or more wireless sensing signals transmitted by one or more network nodes (e.g., one or more base stations, one or more UEs, or a combination thereof), the one or more wireless sensing signals configured based on the one or more parameters. In an aspect, operation 830 may be performed by the one or more WWAN transceivers 310, the one or more short-range wireless transceivers 320, the one or more processors 332, memory 340, and/or positioning component 342, any or all of which may be considered means for performing this operation. In an aspect, the bistatic sensing operation may be performed with the same or different transceiver of the one or more WWAN transceivers 310 and/or the one or more short-range wireless transceivers 320 than performed the monostatic sensing operation.

Figure 9:
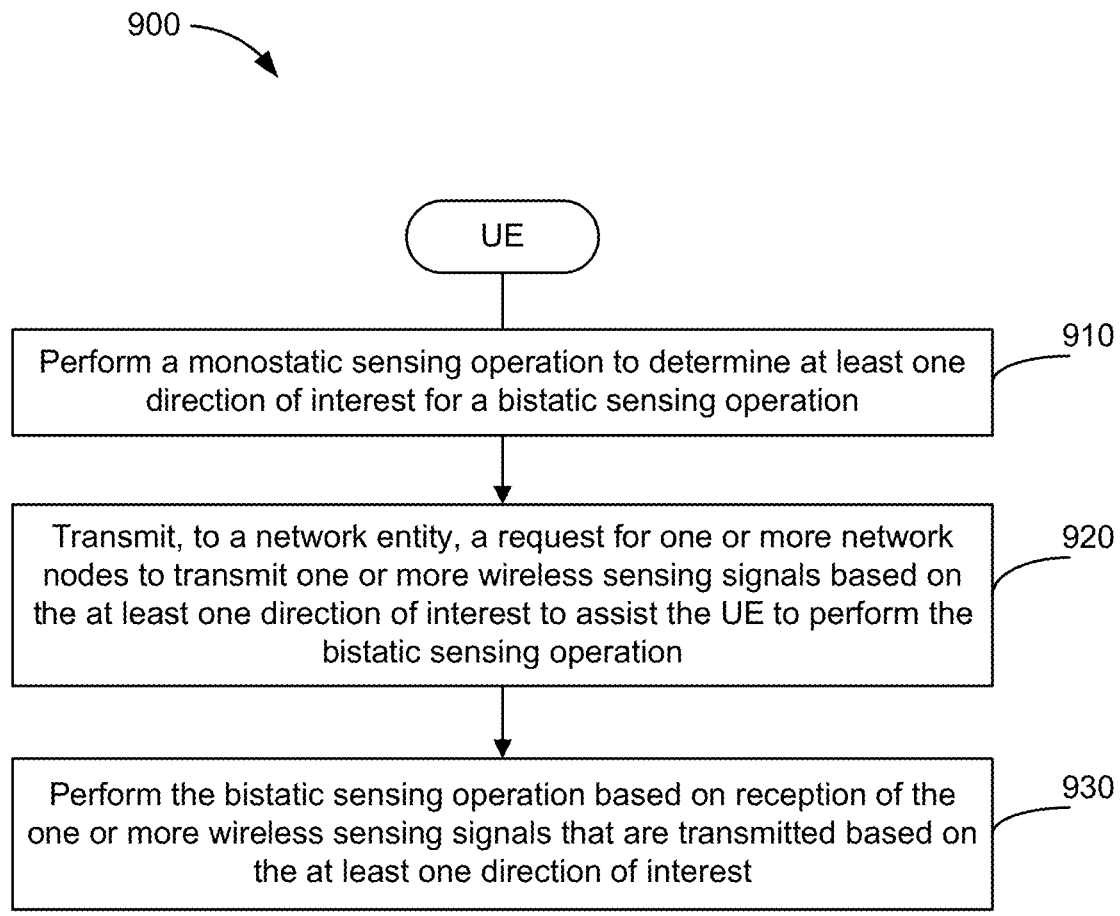

FIG. 9 illustrates an example method 900 of environment sensing, according to aspects of the disclosure. In an aspect, method 900 may be performed by a UE (e.g., any of the UEs described herein).

At 910, the UE performs a monostatic sensing operation to determine at least one direction of interest for a bistatic sensing operation. In an aspect, operation 910 may be performed by the one or more WWAN transceivers 310, the one or more short-range wireless transceivers 320, the one or more processors 332, memory 340, and/or positioning component 342, any or all of which may be considered means for performing this operation.

At 920, the UE transmits, to a network entity (e.g., a sensing server, a base station, a UE), a request for one or more network nodes (e.g., one or more base stations, one or more UEs, or a combination thereof) to transmit one or more wireless sensing signals based on the at least one direction of interest to assist the UE to perform the bistatic sensing operation. In an aspect, based on the at least one direction of interest being omni-directional, the one or more network nodes may comprise a plurality of network nodes around the UE. In another aspect, based on the at least one direction of interest being a specific angle, the one or more network nodes may comprise at least one network node configured to transmit wireless sensing signals based on the specific angle. In another aspect, based on the at least one direction of interest being a plurality of specific angles, the one or more network nodes may comprise at least one network node configured to transmit wireless sensing signals based on the plurality of specific angles. In an aspect, operation 920 may be performed by the one or more WWAN transceivers 310, the one or more short-range wireless transceivers 320, the one or more processors 332, memory 340, and/or positioning component 342, any or all of which may be considered means for performing this operation.

At 930, the UE performs the bistatic sensing operation based on reception of the one or more wireless sensing signals that are transmitted based on the at least one direction of interest. In an aspect, operation 930 may be performed by the one or more WWAN transceivers 310, the one or more short-range wireless transceivers 320, the one or more processors 332, memory 340, and/or positioning component 342, any or all of which may be considered means for performing this operation. In an aspect, the bistatic sensing operation may be performed with the same or different transceiver of the one or more WWAN transceivers 310 and/or the one or more short-range wireless transceivers 320 than performed the monostatic sensing operation.

As will be appreciated, although the methods described with reference to FIGS. 7, 8, and 9 have been described as being performed by a UE, the methods can also be performed by a network node, such as a base station, an access point, or an RSU.

As will be appreciated, a technical advantage of the methods 700 to 900 is improved sensing performance based on the UE being able to utilize both monostatic and bistatic sensing.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of environment sensing performed by a user equipment (UE), comprising: performing a monostatic sensing operation to detect one or more characteristics of one or more objects in an environment of the UE; transmitting, to a network entity, based on detection of the one or more characteristics of the one or more objects, a request for one or more network nodes to transmit one or more wireless sensing signals to assist the UE to perform a bistatic sensing operation;

and performing the bistatic sensing operation based on reception of the one or more wireless sensing signals to detect additional characteristics of the one or more objects.

Clause 2. The method of clause 1, wherein: the monostatic sensing operation is performed using a first wireless transceiver of the UE, and the bistatic sensing operation is performed using a second wireless transceiver of the UE.

Clause 3. The method of clause 2, wherein: the first wireless transceiver is a wireless local area network (WLAN) transceiver, and the second wireless transceiver is a cellular network transceiver.

Clause 4. The method of clause 2, wherein the second wireless transceiver is the same as the first wireless transceiver.

Clause 5. The method of any of clauses 1 to 4, wherein: the network entity is a serving base station of the UE, and the one or more network nodes are one or more base stations (e.g., the serving base station, one or more secondary base stations, one or more neighboring base stations, or any combination thereof).

Clause 6. The method of clause 5, wherein the request is transmitted to the network entity via radio resource control (RRC) signaling, medium access control control element (MAC-CE) signaling, or uplink control information (UCI) signaling.

Clause 7. The method of any of clauses 5 to 6, wherein the one or more wireless sensing signals comprise: one or more cell-specific reference signals (CRS) transmitted by the one or more network nodes to enable the UE to detect the additional characteristics of the one or more objects, or one or more reference signals dedicated to sensing.

Clause 8. The method of any of clauses 1 to 4, wherein: the network entity is a second UE in communication with the UE, and the one or more network nodes are one or more UEs in communication with the UE (e.g., the second UE, one or more other UEs, or any combination thereof).

Clause 9. The method of clause 8, wherein the request is transmitted to the network entity via device-to-device (D2D) signaling (e.g., sidelink or other D2D signaling).

Clause 10. The method of any of clauses 8 to 9, wherein the one or more wireless sensing signals comprise one or more sounding reference signals (SRS) or one or more sidelink positioning reference signals (SL-PRS) transmitted by the one or more network nodes to enable the UE to detect the additional characteristics of the one or more objects.

Clause 11. The method of any of clauses 1 to 4, wherein the network entity is a sensing server in communication with the one or more network nodes.

Clause 12. The method of any of clauses 1 to 11, wherein the one or more characteristics of the one or more objects comprise a motion state of the one or more objects, an orientation of the one or more objects, a speed of the one or more objects, a direction of movement of the one or more objects, a number of the one or more objects, or any combination thereof.

Clause 13. The method of any of clauses 1 to 12, wherein the additional characteristics of the one or more objects comprise more detailed values for the one or more characteristics of the one or more objects than values of the one or more characteristics of the one or more objects determined from the monostatic sensing operation.

Clause 14. A method of environment sensing performed by a user equipment (UE), comprising: performing a monostatic sensing operation to detect one or more characteristics of an environment of the UE, one or more objects in the environment of the UE, or both; transmitting one or more parameters for a bistatic sensing operation to a network entity, the one or more parameters determined based, at least in part, on the one or more characteristics of the environment, the one or more objects, or both; and performing the bistatic sensing operation based on reception of one or more wireless sensing signals transmitted by one or more network nodes, the one or more wireless sensing signals configured based on the one or more parameters.

Clause 15. The method of clause 14, wherein the one or more parameters include at least one parameter based on preconfigured characteristics of the environment, the one or more objects, or both.

Clause 16. The method of clause 15, wherein the preconfigured characteristics of the environment, the one or more objects, or both include a map of the environment.

Clause 17. The method of any of clauses 14 to 16, wherein the one or more characteristics of the environment, the one or more objects, or both comprise a location of the UE in the environment, an orientation of the UE relative to the environment, a motion state of the one or more objects, an orientation of the one or more objects, a speed of the one or more objects, a direction of movement of the one or more objects, a number of the one or more objects, or any combination thereof.

Clause 18. The method of any of clauses 14 to 17, wherein the one or more parameters for the bistatic sensing operation comprise a direction of the one or more wireless sensing signals transmitted by the one or more network nodes, a frequency range of the one or more wireless sensing signals, a periodicity of the one or more wireless sensing signals, or any combination thereof.

Clause 19. The method of any of clauses 14 to 18, wherein: the monostatic sensing operation is performed using a first wireless transceiver of the UE, and the bistatic sensing operation is performed using a second wireless transceiver of the UE.

Clause 20. The method of clause 19, wherein: the first wireless transceiver is a wireless local area network (WLAN) transceiver, and the second wireless transceiver is a cellular network transceiver.

Clause 21. The method of clause 19, wherein the second wireless transceiver is the same as the first wireless transceiver.

Clause 22. The method of any of clauses 14 to 21, wherein: the network entity is a serving base station of the UE, the one or more network nodes are one or more base stations (e.g., the serving base station, one or more secondary base stations, one or more neighboring base stations, or any combination thereof), and the one or more parameters are transmitted to the network entity via radio resource control (RRC) signaling, medium access control control element (MAC-CE) signaling, or uplink control information (UCI) signaling.

Clause 23. The method of any of clauses 14 to 21, wherein: the network entity is a second UE in communication with the UE, the one or more network nodes are one or more UEs in communication with the UE (e.g., the second UE, one or more other UEs, or any combination thereof), and the one or more parameters are transmitted to the network entity via device-to-device (D2D) signaling.

Clause 24. The method of any of clauses 14 to 21, wherein the network entity is a sensing server in communication with the one or more network nodes.

Clause 25. A method of environment sensing performed by a user equipment (UE), comprising: performing a monostatic sensing operation to determine at least one direction of interest for a bistatic sensing operation; transmitting, to a network entity, a request for one or more network nodes to transmit one or more wireless sensing signals based on the at least one direction of interest to assist the UE to perform the bistatic sensing operation; and performing the bistatic sensing operation based on reception of the one or more wireless sensing signals that are transmitted based on the at least one direction of interest.

Clause 26. The method of clause 25, wherein, based on the at least one direction of interest being omni-directional, the one or more network nodes comprise a plurality of network nodes around the UE.

Clause 27. The method of any of clauses 25 to 26, wherein, based on the at least one direction of interest being a specific angle, the one or more network nodes comprise at least one network node configured to transmit wireless sensing signals based on the specific angle.

Clause 28. The method of any of clauses 25 to 27, wherein, based on the at least one direction of interest being a plurality of specific angles, the one or more network nodes comprise at least one network node configured to transmit wireless sensing signals based on the plurality of specific angles.

Clause 29. The method of any of clauses 25 to 28, wherein: the monostatic sensing operation is performed using a first wireless transceiver of the UE, and the bistatic sensing operation is performed using a second wireless transceiver of the UE.

Clause 30. The method of clause 29, wherein: the first wireless transceiver is a wireless local area network (WLAN) transceiver, and the second wireless transceiver is a cellular network transceiver.

Clause 31. The method of clause 29, wherein the second wireless transceiver is the same as the first wireless transceiver.

Clause 32. The method of any of clauses 25 to 31, wherein: the network entity is a serving base station of the UE, the one or more network nodes are one or more base stations (e.g., the serving base station, one or more secondary base stations, one or more neighboring base stations, or any combination thereof), and the request is transmitted to the network entity via radio resource control (RRC) signaling, medium access control control element (MAC-CE) signaling, or uplink control information (UCI) signaling.

Clause 33. The method of any of clauses 25 to 31, wherein: the network entity is a second UE in communication with the UE, the one or more network nodes are one or more UEs in communication with the UE (e.g., the second UE, one or more other UEs, or any combination thereof), and the request is transmitted to the network entity via device-to-device (D2D) signaling.

Clause 34. The method of any of clauses 25 to 31, wherein the network entity is a sensing server in communication with the one or more network nodes.

Clause 35. A user equipment (UE), comprising: a memory; at least one transceiver; and at least one processor communicatively coupled to the memory and the at least one transceiver, the at least one processor configured to: perform a monostatic sensing operation to detect one or more characteristics of one or more objects in an environment of the UE; transmit, via the at least one transceiver, to a network entity, based on detection of the one or more characteristics of the one or more objects, a request for one or more network nodes to transmit one or more wireless sensing signals to assist the UE to perform a bistatic sensing operation; and perform the bistatic sensing operation based on reception of the one or more wireless sensing signals to detect additional characteristics of the one or more objects.

Clause 36. The UE of clause 35, wherein: the monostatic sensing operation is performed using a first wireless transceiver of the UE, and the bistatic sensing operation is performed using a second wireless transceiver of the UE.

Clause 37. The UE of clause 36, wherein: the first wireless transceiver is a wireless local area network (WLAN) transceiver, and the second wireless transceiver is a cellular network transceiver.

Clause 38. The UE of clause 36, wherein the second wireless transceiver is the same as the first wireless transceiver.

Clause 39. The UE of any of clauses 35 to 38, wherein: the network entity is a serving base station of the UE, and the one or more network nodes are one or more base stations.

Clause 40. The UE of clause 39, wherein the request is transmitted to the network entity via radio resource control (RRC) signaling, medium access control control element (MAC-CE) signaling, or uplink control information (UCI) signaling.

Clause 41. The UE of any of clauses 39 to 40, wherein the one or more wireless sensing signals comprise: one or more cell-specific reference signals (CRS) transmitted by the one or more network nodes to enable the UE to detect the additional characteristics of the one or more objects, or one or more reference signals dedicated to sensing.

Clause 42. The UE of any of clauses 35 to 38, wherein: the network entity is a second UE in communication with the UE, and the one or more network nodes are one or more UEs in communication with the UE.

Clause 43. The UE of clause 42, wherein the request is transmitted to the network entity via device-to-device (D2D) signaling.

Clause 44. The UE of any of clauses 42 to 43, wherein the one or more wireless sensing signals comprise one or more sounding reference signals (SRS) or one or more sidelink positioning reference signals (SL-PRS) transmitted by the one or more network nodes to enable the UE to detect the additional characteristics of the one or more objects.

Clause 45. The UE of any of clauses 35 to 38, wherein the network entity is a sensing server in communication with the one or more network nodes.

Clause 46. The UE of any of clauses 35 to 45, wherein the one or more characteristics of the one or more objects comprise a motion state of the one or more objects, an orientation of the one or more objects, a speed of the one or more objects, a direction of movement of the one or more objects, a number of the one or more objects, or any combination thereof.

Clause 47. The UE of any of clauses 35 to 46, wherein the additional characteristics of the one or more objects comprise more detailed values for the one or more characteristics of the one or more objects than values of the one or more characteristics of the one or more objects determined from the monostatic sensing operation.

Clause 48. A user equipment (UE), comprising: a memory; at least one transceiver; and at least one processor communicatively coupled to the memory and the at least one transceiver, the at least one processor configured to: perform a monostatic sensing operation to detect one or more characteristics of an environment of the UE, one or more objects in the environment of the UE, or both; transmit, via the at least one transceiver, one or more parameters for a bistatic sensing operation to a network entity, the one or more parameters determined based, at least in part, on the one or more characteristics of the environment, the one or more objects, or both; and perform the bistatic sensing operation based on reception of one or more wireless sensing signals transmitted by one or more network nodes, the one or more wireless sensing signals configured based on the one or more parameters.

Clause 49. The UE of clause 48, wherein the one or more parameters include at least one parameter based on preconfigured characteristics of the environment, the one or more objects, or both.

Clause 50. The UE of clause 49, wherein the preconfigured characteristics of the environment, the one or more objects, or both include a map of the environment.

Clause 51. The UE of any of clauses 48 to 50, wherein the one or more characteristics of the environment, the one or more objects, or both comprise a location of the UE in the environment, an orientation of the UE relative to the environment, a motion state of the one or more objects, an orientation of the one or more objects, a speed of the one or more objects, a direction of movement of the one or more objects, a number of the one or more objects, or any combination thereof.

Clause 52. The UE of any of clauses 48 to 51, wherein the one or more parameters for the bistatic sensing operation comprise a direction of the one or more wireless sensing signals transmitted by the one or more network nodes, a frequency range of the one or more wireless sensing signals, a periodicity of the one or more wireless sensing signals, or any combination thereof.

Clause 53. The UE of any of clauses 48 to 52, wherein: the monostatic sensing operation is performed using a first wireless transceiver of the UE, and the bistatic sensing operation is performed using a second wireless transceiver of the UE.

Clause 54. The UE of clause 53, wherein: the first wireless transceiver is a wireless local area network (WLAN) transceiver, and the second wireless transceiver is a cellular network transceiver.

Clause 55. The UE of clause 53, wherein the second wireless transceiver is the same as the first wireless transceiver.

Clause 56. The UE of any of clauses 48 to 55, wherein: the network entity is a serving base station of the UE, the one or more network nodes are one or more base stations, and the one or more parameters are transmitted to the network entity via radio resource control (RRC) signaling, medium access control control element (MAC-CE) signaling, or uplink control information (UCI) signaling.

Clause 57. The UE of any of clauses 48 to 55, wherein: the network entity is a second UE in communication with the UE, the one or more network nodes are one or more UEs in communication with the UE, and the one or more parameters are transmitted to the network entity via device-to-device (D2D) signaling.

Clause 58. The UE of any of clauses 48 to 55, wherein the network entity is a sensing server in communication with the one or more network nodes.

Clause 59. A user equipment (UE), comprising: a memory; at least one transceiver; and at least one processor communicatively coupled to the memory and the at least one transceiver, the at least one processor configured to: perform a monostatic sensing operation to determine at least one direction of interest for a bistatic sensing operation; transmit, via the at least one transceiver, to a network entity, a request for one or more network nodes to transmit one or more wireless sensing signals based on the at least one direction of interest to assist the UE to perform the bistatic sensing operation; and perform the bistatic sensing operation based on reception of the one or more wireless sensing signals that are transmitted based on the at least one direction of interest.

Clause 60. The UE of clause 59, wherein, based on the at least one direction of interest being omni-directional, the one or more network nodes comprise a plurality of network nodes around the UE.

Clause 61. The UE of any of clauses 59 to 60, wherein, based on the at least one direction of interest being a specific angle, the one or more network nodes comprise at least one network node configured to transmit wireless sensing signals based on the specific angle.

Clause 62. The UE of any of clauses 59 to 61, wherein, based on the at least one direction of interest being a plurality of specific angles, the one or more network nodes comprise at least one network node configured to transmit wireless sensing signals based on the plurality of specific angles.

Clause 63. The UE of any of clauses 59 to 62, wherein: the monostatic sensing operation is performed using a first wireless transceiver of the UE, and the bistatic sensing operation is performed using a second wireless transceiver of the UE.

Clause 64. The UE of clause 63, wherein: the first wireless transceiver is a wireless local area network (WLAN) transceiver, and the second wireless transceiver is a cellular network transceiver.

Clause 65. The UE of clause 63, wherein the second wireless transceiver is the same as the first wireless transceiver.

Clause 66. The UE of any of clauses 59 to 65, wherein: the network entity is a serving base station of the UE, the one or more network nodes are one or more base stations, and the request is transmitted to the network entity via radio resource control (RRC) signaling, medium access control control element (MAC-CE) signaling, or uplink control information (UCI) signaling.

Clause 67. The UE of any of clauses 59 to 65, wherein: the network entity is a second UE in communication with the UE, the one or more network nodes are one or more UEs in communication with the UE, and the request is transmitted to the network entity via device-to-device (D2D) signaling.

Clause 68. The UE of any of clauses 59 to 65, wherein the network entity is a sensing server in communication with the one or more network nodes.

Clause 69. A user equipment (UE), comprising: means for performing a monostatic sensing operation to detect one or more characteristics of one or more objects in an environment of the UE; means for transmitting, to a network entity, based on detection of the one or more characteristics of the one or more objects, a request for one or more network nodes to transmit one or more wireless sensing signals to assist the UE to perform a bistatic sensing operation; and means for performing the bistatic sensing operation based on reception of the one or more wireless sensing signals to detect additional characteristics of the one or more objects.

Clause 70. The UE of clause 69, wherein: the monostatic sensing operation is performed using a first wireless transceiver of the UE, and the bistatic sensing operation is performed using a second wireless transceiver of the UE.

Clause 71. The UE of clause 70, wherein: the first wireless transceiver is a wireless local area network (WLAN) transceiver, and the second wireless transceiver is a cellular network transceiver.

Clause 72. The UE of clause 70, wherein the second wireless transceiver is the same as the first wireless transceiver.

Clause 73. The UE of any of clauses 69 to 72, wherein: the network entity is a serving base station of the UE, and the one or more network nodes are one or more base stations.

Clause 74. The UE of clause 73, wherein the request is transmitted to the network entity via radio resource control (RRC) signaling, medium access control control element (MAC-CE) signaling, or uplink control information (UCI) signaling.

Clause 75. The UE of any of clauses 73 to 74, wherein the one or more wireless sensing signals comprise: one or more cell-specific reference signals (CRS) transmitted by the one or more network nodes to enable the UE to detect the additional characteristics of the one or more objects, or one or more reference signals dedicated to sensing.

Clause 76. The UE of any of clauses 69 to 72, wherein: the network entity is a second UE in communication with the UE, and the one or more network nodes are one or more UEs in communication with the UE.

Clause 77. The UE of clause 76, wherein the request is transmitted to the network entity via device-to-device (D2D) signaling.

Clause 78. The UE of any of clauses 76 to 77, wherein the one or more wireless sensing signals comprise one or more sounding reference signals (SRS) or one or more sidelink positioning reference signals (SL-PRS) transmitted by the one or more network nodes to enable the UE to detect the additional characteristics of the one or more objects.

Clause 79. The UE of any of clauses 69 to 72, wherein the network entity is a sensing server in communication with the one or more network nodes.

Clause 80. The UE of any of clauses 69 to 79, wherein the one or more characteristics of the one or more objects comprise a motion state of the one or more objects, an orientation of the one or more objects, a speed of the one or more objects, a direction of movement of the one or more objects, a number of the one or more objects, or any combination thereof.

Clause 81. The UE of any of clauses 69 to 80, wherein the additional characteristics of the one or more objects comprise more detailed values for the one or more characteristics of the one or more objects than values of the one or more characteristics of the one or more objects determined from the monostatic sensing operation.

Clause 82. A user equipment (UE), comprising: means for performing a monostatic sensing operation to detect one or more characteristics of an environment of the UE, one or more objects in the environment of the UE, or both; means for transmitting one or more parameters for a bistatic sensing operation to a network entity, the one or more parameters determined based, at least in part, on the one or more characteristics of the environment, the one or more objects, or both; and means for performing the bistatic sensing operation based on reception of one or more wireless sensing signals transmitted by one or more network nodes, the one or more wireless sensing signals configured based on the one or more parameters.

Clause 83. The UE of clause 82, wherein the one or more parameters include at least one parameter based on preconfigured characteristics of the environment, the one or more objects, or both.

Clause 84. The UE of clause 83, wherein the preconfigured characteristics of the environment, the one or more objects, or both include a map of the environment.

Clause 85. The UE of any of clauses 82 to 84, wherein the one or more characteristics of the environment, the one or more objects, or both comprise a location of the UE in the environment, an orientation of the UE relative to the environment, a motion state of the one or more objects, an orientation of the one or more objects, a speed of the one or more objects, a direction of movement of the one or more objects, a number of the one or more objects, or any combination thereof.

Clause 86. The UE of any of clauses 82 to 85, wherein the one or more parameters for the bistatic sensing operation comprise a direction of the one or more wireless sensing signals transmitted by the one or more network nodes, a frequency range of the one or more wireless sensing signals, a periodicity of the one or more wireless sensing signals, or any combination thereof.

Clause 87. The UE of any of clauses 82 to 86, wherein: the monostatic sensing operation is performed using a first wireless transceiver of the UE, and the bistatic sensing operation is performed using a second wireless transceiver of the UE.

Clause 88. The UE of clause 87, wherein: the first wireless transceiver is a wireless local area network (WLAN) transceiver, and the second wireless transceiver is a cellular network transceiver.

Clause 89. The UE of clause 87, wherein the second wireless transceiver is the same as the first wireless transceiver.

Clause 90. The UE of any of clauses 82 to 89, wherein: the network entity is a serving base station of the UE, the one or more network nodes are one or more base stations, and the one or more parameters are transmitted to the network entity via radio resource control (RRC) signaling, medium access control control element (MAC-CE) signaling, or uplink control information (UCI) signaling.

Clause 91. The UE of any of clauses 82 to 89, wherein: the network entity is a second UE in communication with the UE, the one or more network nodes are one or more UEs in communication with the UE, and the one or more parameters are transmitted to the network entity via device-to-device (D2D) signaling.

Clause 92. The UE of any of clauses 82 to 89, wherein the network entity is a sensing server in communication with the one or more network nodes.

Clause 93. A user equipment (UE), comprising: means for performing a monostatic sensing operation to determine at least one direction of interest for a bistatic sensing operation; means for transmitting, to a network entity, a request for one or more network nodes to transmit one or more wireless sensing signals based on the at least one direction of interest to assist the UE to perform the bistatic sensing operation; and means for performing the bistatic sensing operation based on reception of the one or more wireless sensing signals that are transmitted based on the at least one direction of interest.

Clause 94. The UE of clause 93, wherein, based on the at least one direction of interest being omni-directional, the one or more network nodes comprise a plurality of network nodes around the UE.

Clause 95. The UE of any of clauses 93 to 94, wherein, based on the at least one direction of interest being a specific angle, the one or more network nodes comprise at least one network node configured to transmit wireless sensing signals based on the specific angle.

Clause 96. The UE of any of clauses 93 to 95, wherein, based on the at least one direction of interest being a plurality of specific angles, the one or more network nodes comprise at least one network node configured to transmit wireless sensing signals based on the plurality of specific angles.

Clause 97. The UE of any of clauses 93 to 96, wherein: the monostatic sensing operation is performed using a first wireless transceiver of the UE, and the bistatic sensing operation is performed using a second wireless transceiver of the UE.

Clause 98. The UE of clause 97, wherein: the first wireless transceiver is a wireless local area network (WLAN) transceiver, and the second wireless transceiver is a cellular network transceiver.

Clause 99. The UE of clause 97, wherein the second wireless transceiver is the same as the first wireless transceiver.

Clause 100. The UE of any of clauses 93 to 99, wherein: the network entity is a serving base station of the UE, the one or more network nodes are one or more base stations, and the request is transmitted to the network entity via radio resource control (RRC) signaling, medium access control control element (MAC-CE) signaling, or uplink control information (UCI) signaling.

Clause 101. The UE of any of clauses 93 to 99, wherein: the network entity is a second UE in communication with the UE, the one or more network nodes are one or more UEs in communication with the UE, and the request is transmitted to the network entity via device-to-device (D2D) signaling.

Clause 102. The UE of any of clauses 93 to 99, wherein the network entity is a sensing server in communication with the one or more network nodes.

Clause 103. A non-transitory computer-readable medium storing computer-executable instructions that, when executed by a user equipment (UE), cause the UE to: perform a monostatic sensing operation to detect one or more characteristics of one or more objects in an environment of the UE; transmit, to a network entity, based on detection of the one or more characteristics of the one or more objects, a request for one or more network nodes to transmit one or more wireless sensing signals to assist the UE to perform a bistatic sensing operation; and perform the bistatic sensing operation based on reception of the one or more wireless sensing signals to detect additional characteristics of the one or more objects.

Clause 104. The non-transitory computer-readable medium of clause 103, wherein: the monostatic sensing operation is performed using a first wireless transceiver of the UE, and the bistatic sensing operation is performed using a second wireless transceiver of the UE.

Clause 105. The non-transitory computer-readable medium of clause 104, wherein: the first wireless transceiver is a wireless local area network (WLAN) transceiver, and the second wireless transceiver is a cellular network transceiver.

Clause 106. The non-transitory computer-readable medium of clause 104, wherein the second wireless transceiver is the same as the first wireless transceiver.

Clause 107. The non-transitory computer-readable medium of any of clauses 103 to 106, wherein: the network entity is a serving base station of the UE, and the one or more network nodes are one or more base stations.

Clause 108. The non-transitory computer-readable medium of clause 107, wherein the request is transmitted to the network entity via radio resource control (RRC) signaling, medium access control control element (MAC-CE) signaling, or uplink control information (UCI) signaling.

Clause 109. The non-transitory computer-readable medium of any of clauses 107 to 108, wherein the one or more wireless sensing signals comprise: one or more cell-specific reference signals (CRS) transmitted by the one or more network nodes to enable the UE to detect the additional characteristics of the one or more objects, or one or more reference signals dedicated to sensing.

Clause 110. The non-transitory computer-readable medium of any of clauses 103 to 106, wherein: the network entity is a second UE in communication with the UE, and the one or more network nodes are one or more UEs in communication with the UE.

Clause 111. The non-transitory computer-readable medium of clause 110, wherein the request is transmitted to the network entity via device-to-device (D2D) signaling.

Clause 112. The non-transitory computer-readable medium of any of clauses 110 to 111, wherein the one or more wireless sensing signals comprise one or more sounding reference signals (SRS) or one or more sidelink positioning reference signals (SL-PRS) transmitted by the one or more network nodes to enable the UE to detect the additional characteristics of the one or more objects.

Clause 113. The non-transitory computer-readable medium of any of clauses 103 to 106, wherein the network entity is a sensing server in communication with the one or more network nodes.

Clause 114. The non-transitory computer-readable medium of any of clauses 103 to 113, wherein the one or more characteristics of the one or more objects comprise a motion state of the one or more objects, an orientation of the one or more objects, a speed of the one or more objects, a direction of movement of the one or more objects, a number of the one or more objects, or any combination thereof.

Clause 115. The non-transitory computer-readable medium of any of clauses 103 to 114, wherein the additional characteristics of the one or more objects comprise more detailed values for the one or more characteristics of the one or more objects than values of the one or more characteristics of the one or more objects determined from the monostatic sensing operation.

Clause 116. A non-transitory computer-readable medium storing computer-executable instructions that, when executed by a user equipment (UE), cause the UE to: perform a monostatic sensing operation to detect one or more characteristics of an environment of the UE, one or more objects in the environment of the UE, or both; transmit one or more parameters for a bistatic sensing operation to a network entity, the one or more parameters determined based, at least in part, on the one or more characteristics of the environment, the one or more objects, or both; and perform the bistatic sensing operation based on reception of one or more wireless sensing signals transmitted by one or more network nodes, the one or more wireless sensing signals configured based on the one or more parameters.

Clause 117. The non-transitory computer-readable medium of clause 116, wherein the one or more parameters include at least one parameter based on preconfigured characteristics of the environment, the one or more objects, or both.

Clause 118. The non-transitory computer-readable medium of clause 117, wherein the preconfigured characteristics of the environment, the one or more objects, or both include a map of the environment.

Clause 119. The non-transitory computer-readable medium of any of clauses 116 to 118, wherein the one or more characteristics of the environment, the one or more objects, or both comprise a location of the UE in the environment, an orientation of the UE relative to the environment, a motion state of the one or more objects, an orientation of the one or more objects, a speed of the one or more objects, a direction of movement of the one or more objects, a number of the one or more objects, or any combination thereof.

Clause 120. The non-transitory computer-readable medium of any of clauses 116 to 119, wherein the one or more parameters for the bistatic sensing operation comprise a direction of the one or more wireless sensing signals transmitted by the one or more network nodes, a frequency range of the one or more wireless sensing signals, a periodicity of the one or more wireless sensing signals, or any combination thereof.

Clause 121. The non-transitory computer-readable medium of any of clauses 116 to 120, wherein: the monostatic sensing operation is performed using a first wireless transceiver of the UE, and the bistatic sensing operation is performed using a second wireless transceiver of the UE.

Clause 122. The non-transitory computer-readable medium of clause 121, wherein: the first wireless transceiver is a wireless local area network (WLAN) transceiver, and the second wireless transceiver is a cellular network transceiver.

Clause 123. The non-transitory computer-readable medium of clause 121, wherein the second wireless transceiver is the same as the first wireless transceiver.

Clause 124. The non-transitory computer-readable medium of any of clauses 116 to 123, wherein: the network entity is a serving base station of the UE, the one or more network nodes are one or more base stations, and the one or more parameters are transmitted to the network entity via radio resource control (RRC) signaling, medium access control control element (MAC-CE) signaling, or uplink control information (UCI) signaling.

Clause 125. The non-transitory computer-readable medium of any of clauses 116 to 123, wherein: the network entity is a second UE in communication with the UE, the one or more network nodes are one or more UEs in communication with the UE, and the one or more parameters are transmitted to the network entity via device-to-device (D2D) signaling.

Clause 126. The non-transitory computer-readable medium of any of clauses 116 to 123, wherein the network entity is a sensing server in communication with the one or more network nodes.

Clause 127. A non-transitory computer-readable medium storing computer-executable instructions that, when executed by a user equipment (UE), cause the UE to: perform a monostatic sensing operation to determine at least one direction of interest for a bistatic sensing operation; transmit, to a network entity, a request for one or more network nodes to transmit one or more wireless sensing signals based on the at least one direction of interest to assist the UE to perform the bistatic sensing operation; and perform the bistatic sensing operation based on reception of the one or more wireless sensing signals that are transmitted based on the at least one direction of interest.

Clause 128. The non-transitory computer-readable medium of clause 127, wherein, based on the at least one direction of interest being omni-directional, the one or more network nodes comprise a plurality of network nodes around the UE.

Clause 129. The non-transitory computer-readable medium of any of clauses 127 to 128, wherein, based on the at least one direction of interest being a specific angle, the one or more network nodes comprise at least one network node configured to transmit wireless sensing signals based on the specific angle.

Clause 130. The non-transitory computer-readable medium of any of clauses 127 to 129, wherein, based on the at least one direction of interest being a plurality of specific angles, the one or more network nodes comprise at least one network node configured to transmit wireless sensing signals based on the plurality of specific angles.

Clause 131. The non-transitory computer-readable medium of any of clauses 127 to 130, wherein: the monostatic sensing operation is performed using a first wireless transceiver of the UE, and the bistatic sensing operation is performed using a second wireless transceiver of the UE.

Clause 132. The non-transitory computer-readable medium of clause 131, wherein: the first wireless transceiver is a wireless local area network (WLAN) transceiver, and the second wireless transceiver is a cellular network transceiver.

Clause 133. The non-transitory computer-readable medium of clause 131, wherein the second wireless transceiver is the same as the first wireless transceiver.

Clause 134. The non-transitory computer-readable medium of any of clauses 127 to 133, wherein: the network entity is a serving base station of the UE, the one or more network nodes are one or more base stations, and the request is transmitted to the network entity via radio resource control (RRC) signaling, medium access control control element (MAC-CE) signaling, or uplink control information (UCI) signaling.

Clause 135. The non-transitory computer-readable medium of any of clauses 127 to 133, wherein: the network entity is a second UE in communication with the UE, the one or more network nodes are one or more UEs in communication with the UE, and the request is transmitted to the network entity via device-to-device (D2D) signaling.

Clause 136. The non-transitory computer-readable medium of any of clauses 127 to 133, wherein the network entity is a sensing server in communication with the one or more network nodes.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of environment sensing performed by a user equipment (UE), comprising:
    performing a monostatic sensing operation to detect one or more characteristics of one or more objects in an environment of the UE;
    transmitting, to a network entity, based on detection of the one or more characteristics of the one or more objects, a request for one or more network nodes to transmit one or more wireless sensing signals to assist the UE to perform one or more bistatic sensing operations; and performing the one or more bistatic sensing operations based on reception of the one or more wireless sensing signals to detect additional characteristics of the one or more objects.

2. The method of claim 1, wherein:
the monostatic sensing operation is performed using a first wireless transceiver of the UE, and
the one or more bistatic sensing operations are performed using a second wireless transceiver of the UE.

3. The method of claim 2, wherein:
the first wireless transceiver is a wireless local area network (WLAN) transceiver, and
the second wireless transceiver is a cellular network transceiver.

4. The method of claim 2, wherein the second wireless transceiver is the same as the first wireless transceiver.

5. The method of claim 1, wherein:
the network entity is a serving base station of the UE, and
the one or more network nodes are one or more base stations.

6. The method of claim 5, wherein the request is transmitted to the network entity via radio resource control (RRC) signaling, medium access control control element (MAC-CE) signaling, or uplink control information (UCI) signaling.

7. The method of claim 5, wherein the one or more wireless sensing signals comprise:
one or more cell-specific reference signals (CRS) transmitted by the one or more network nodes to enable the UE to detect the additional characteristics of the one or more objects, or
one or more reference signals dedicated to sensing.

8. The method of claim 1, wherein:
the network entity is a second UE in communication with the UE, and
the one or more network nodes are one or more UEs in communication with the UE.

9. The method of claim 8, wherein the request is transmitted to the network entity via device-to-device (D2D) signaling.

10. The method of claim 8, wherein the one or more wireless sensing signals comprise one or more sounding reference signals (SRS) or one or more sidelink positioning reference signals (SL-PRS) transmitted by the one or more network nodes to enable the UE to detect the additional characteristics of the one or more objects.

11. The method of claim 1, wherein the network entity is a sensing server in communication with the one or more network nodes.

12. The method of claim 1, wherein the one or more characteristics of the one or more objects comprise a motion state of the one or more objects, an orientation of the one or more objects, a speed of the one or more objects, a direction of movement of the one or more objects, a number of the one or more objects, or any combination thereof.

13. The method of claim 1, wherein the additional characteristics of the one or more objects comprise more detailed values for the one or more characteristics of the one or more objects than values of the one or more characteristics of the one or more objects determined from the monostatic sensing operation.

14. A method of environment sensing performed by a user equipment (UE), comprising:
performing a monostatic sensing operation to detect one or more characteristics of an environment of the UE, one or more objects in the environment of the UE, or both;
transmitting one or more parameters for one or more bistatic sensing operations to a network entity, the one or more parameters determined based, at least in part, on the one or more characteristics of the environment, the one or more objects, or both; and
performing the one or more bistatic sensing operations based on reception of one or more wireless sensing signals transmitted by one or more network nodes, the one or more wireless sensing signals configured based on the one or more parameters.

15. The method of claim 14, wherein the one or more parameters include at least one parameter based on preconfigured characteristics of the environment, the one or more objects, or both.

16. The method of claim 15, wherein the preconfigured characteristics of the environment, the one or more objects, or both include a map of the environment.

17. The method of claim 14, wherein the one or more characteristics of the environment, the one or more objects, or both comprise a location of the UE in the environment, an orientation of the UE relative to the environment, a motion state of the one or more objects, an orientation of the one or more objects, a speed of the one or more objects, a direction of movement of the one or more objects, a number of the one or more objects, or any combination thereof.

18. The method of claim 14, wherein the one or more parameters for the one or more bistatic sensing operations comprise a direction of each of the one or more wireless sensing signals transmitted by the one or more network nodes, a frequency range of each of the one or more wireless sensing signals, a periodicity of each of the one or more wireless sensing signals, a transmit power level of each of the one or more wireless sensing signals, or any combination thereof.

19. The method of claim 14, wherein:
the monostatic sensing operation is performed using a first wireless transceiver of the UE, and
the one or more bistatic sensing operations are performed using a second wireless transceiver of the UE.

20. The method of claim 19, wherein:
the first wireless transceiver is a wireless local area network (WLAN) transceiver, and
the second wireless transceiver is a cellular network transceiver.

21. The method of claim 19, wherein the second wireless transceiver is the same as the first wireless transceiver.

22. The method of claim 14, wherein:
the network entity is a serving base station of the UE,
the one or more network nodes are one or more base stations, and
the one or more parameters are transmitted to the network entity via radio resource control (RRC) signaling, medium access control control element (MAC-CE) signaling, or uplink control information (UCI) signaling.

23. The method of claim 14, wherein:
the network entity is a second UE in communication with the UE,
the one or more network nodes are one or more UEs in communication with the UE, and
the one or more parameters are transmitted to the network entity via device-to-device (D2D) signaling.

24. The method of claim 14, wherein the network entity is a sensing server in communication with the one or more network nodes.

25. A method of environment sensing performed by a user equipment (UE), comprising:

performing a monostatic sensing operation to determine at least one direction of interest for one or more bistatic sensing operations;

transmitting, to a network entity, a request for one or more network nodes to transmit one or more wireless sensing signals based on the at least one direction of interest to assist the UE to perform the one or more bistatic sensing operations; and performing the one or more bistatic sensing operations based on reception of the one or more wireless sensing signals that are transmitted based on the at least one direction of interest.

26. The method of claim 25, wherein, based on the at least one direction of interest being omni-directional, the one or more network nodes comprise a plurality of network nodes around the UE.

27. The method of claim 25, wherein, based on the at least one direction of interest being a specific angle, the one or more network nodes comprise at least one network node configured to transmit wireless sensing signals based on the specific angle.

28. The method of claim 25, wherein, based on the at least one direction of interest being a plurality of specific angles, the one or more network nodes comprise at least one network node configured to transmit wireless sensing signals based on the plurality of specific angles.

29. The method of claim 25, wherein:
the monostatic sensing operation is performed using a first wireless transceiver of the UE, and
the one or more bistatic sensing operations are performed using a second wireless transceiver of the UE.

30. The method of claim 29, wherein:
the first wireless transceiver is a wireless local area network (WLAN) transceiver, and
the second wireless transceiver is a cellular network transceiver.

31. The method of claim 29, wherein the second wireless transceiver is the same as the first wireless transceiver.

32. The method of claim 25, wherein:
the network entity is a serving base station of the UE,
the one or more network nodes are one or more base stations, and
the request is transmitted to the network entity via radio resource control (RRC) signaling, medium access control control element (MAC-CE) signaling, or uplink control information (UCI) signaling.

33. The method of claim 25, wherein:
the network entity is a second UE in communication with the UE,
the one or more network nodes are one or more UEs in communication with the UE, and
the request is transmitted to the network entity via device-to-device (D2D) signaling.

34. The method of claim 25, wherein the network entity is a sensing server in communication with the one or more network nodes.

35. A user equipment (UE), comprising:
one or more memories;
one or more transceivers; and
one or more processors communicatively coupled to the one or more memories and the one or more transceivers, the one or more processors, either alone or in combination, configured to:
perform a monostatic sensing operation to detect one or more characteristics of one or more objects in an environment of the UE;
transmit, via the one or more transceivers, to a network entity, based on detection of the one or more characteristics of the one or more objects, a request for one or more network nodes to transmit one or more wireless sensing signals to assist the UE to perform one or more bistatic sensing operations; and
perform the one or more bistatic sensing operations based on reception of the one or more wireless sensing signals to detect additional characteristics of the one or more objects.

36. The UE of claim 35, wherein:
the monostatic sensing operation is performed using a first wireless transceiver of the UE, and
the one or more bistatic sensing operations is performed using a second wireless transceiver of the UE.

37. The UE of claim 36, wherein:
the first wireless transceiver is a wireless local area network (WLAN) transceiver, and
the second wireless transceiver is a cellular network transceiver.

38. The UE of claim 36, wherein the second wireless transceiver is the same as the first wireless transceiver.

39. The UE of claim 35, wherein:
the network entity is a serving base station of the UE, and
the one or more network nodes are one or more base stations.

40. The UE of claim 39, wherein the request is transmitted to the network entity via radio resource control (RRC) signaling, medium access control control element (MAC-CE) signaling, or uplink control information (UCI) signaling.

41. The UE of claim 39, wherein the one or more wireless sensing signals comprise:
one or more cell-specific reference signals (CRS) transmitted by the one or more network nodes to enable the UE to detect the additional characteristics of the one or more objects, or
one or more reference signals dedicated to sensing.

42. The UE of claim 35, wherein:
the network entity is a second UE in communication with the UE, and
the one or more network nodes are one or more UEs in communication with the UE.

43. The UE of claim 42, wherein the request is transmitted to the network entity via device-to-device (D2D) signaling.

44. The UE of claim 42, wherein the one or more wireless sensing signals comprise one or more sounding reference signals (SRS) or one or more sidelink positioning reference signals (SL-PRS) transmitted by the one or more network nodes to enable the UE to detect the additional characteristics of the one or more objects.

45. The UE of claim 35, wherein the network entity is a sensing server in communication with the one or more network nodes.

46. The UE of claim 35, wherein the one or more characteristics of the one or more objects comprise a motion state of the one or more objects, an orientation of the one or more objects, a speed of the one or more objects, a direction of movement of the one or more objects, a number of the one or more objects, or any combination thereof.

47. The UE of claim 35, wherein the additional characteristics of the one or more objects comprise more detailed values for the one or more characteristics of the one or more objects than values of the one or more characteristics of the one or more objects determined from the monostatic sensing operation.

48. A user equipment (UE), comprising:
one or more memories;
one or more transceivers; and
one or more processors communicatively coupled to the one or more memories and the one or more transceivers, the one or more processors, either alone or in combination, configured to:
perform a monostatic sensing operation to detect one or more characteristics of an environment of the UE, one or more objects in the environment of the UE, or both;
transmit, via the one or more transceivers, one or more parameters for one or more bistatic sensing operations to a network entity, the one or more parameters determined based, at least in part, on the one or more characteristics of the environment, the one or more objects, or both; and
perform the one or more bistatic sensing operations based on reception of one or more wireless sensing signals transmitted by one or more network nodes, the one or more wireless sensing signals configured based on the one or more parameters.

49. The UE of claim 48, wherein the one or more parameters include at least one parameter based on preconfigured characteristics of the environment, the one or more objects, or both.

50. The UE of claim 49, wherein the preconfigured characteristics of the environment, the one or more objects, or both include a map of the environment.

51. The UE of claim 48, wherein the one or more characteristics of the environment, the one or more objects, or both comprise a location of the UE in the environment, an orientation of the UE relative to the environment, a motion state of the one or more objects, an orientation of the one or more objects, a speed of the one or more objects, a direction of movement of the one or more objects, a number of the one or more objects, or any combination thereof.

52. The UE of claim 48, wherein the one or more parameters for the one or more bistatic sensing operations comprise a direction of each of the one or more wireless sensing signals transmitted by the one or more network nodes, a frequency range of each of the one or more wireless sensing signals, a periodicity of each of the one or more wireless sensing signals, or any combination thereof.

53. The UE of claim 48, wherein:
the monostatic sensing operation is performed using a first wireless transceiver of the UE, and
the one or more bistatic sensing operations are performed using a second wireless transceiver of the UE.

54. The UE of claim 53, wherein:
the first wireless transceiver is a wireless local area network (WLAN) transceiver, and
the second wireless transceiver is a cellular network transceiver.

55. The UE of claim 53, wherein the second wireless transceiver is the same as the first wireless transceiver.

56. The UE of claim 48, wherein:
the network entity is a serving base station of the UE,
the one or more network nodes are one or more base stations, and
the one or more parameters are transmitted to the network entity via radio resource control (RRC) signaling, medium access control control element (MAC-CE) signaling, or uplink control information (UCI) signaling.

57. The UE of claim 48, wherein:
the network entity is a second UE in communication with the UE,
the one or more network nodes are one or more UEs in communication with the UE, and
the one or more parameters are transmitted to the network entity via device-to-device (D2D) signaling.

58. The UE of claim 48, wherein the network entity is a sensing server in communication with the one or more network nodes.

59. A user equipment (UE), comprising:
one or more memories;
one or more transceivers; and
one or more processors communicatively coupled to the one or more memories and the one or more transceivers, the one or more processors, either alone or in combination, configured to:
perform a monostatic sensing operation to determine at least one direction of interest for one or more bistatic sensing operations;
transmit, via the one or more transceivers, to a network entity, a request for one or more network nodes to transmit one or more wireless sensing signals based on the at least one direction of interest to assist the UE to perform the one or more bistatic sensing operations; and
perform the one or more bistatic sensing operations based on reception of the one or more wireless sensing signals that are transmitted based on the at least one direction of interest.

60. The UE of claim 59, wherein, based on the at least one direction of interest being omni-directional, the one or more network nodes comprise a plurality of network nodes around the UE.

61. The UE of claim 59, wherein, based on the at least one direction of interest being a specific angle, the one or more network nodes comprise at least one network node configured to transmit wireless sensing signals based on the specific angle.

62. The UE of claim 59, wherein, based on the at least one direction of interest being a plurality of specific angles, the one or more network nodes comprise at least one network node configured to transmit wireless sensing signals based on the plurality of specific angles.

63. The UE of claim 59, wherein:
the monostatic sensing operation is performed using a first wireless transceiver of the UE, and
the one or more bistatic sensing operations are performed using a second wireless transceiver of the UE.

64. The UE of claim 63, wherein:
the first wireless transceiver is a wireless local area network (WLAN) transceiver, and
the second wireless transceiver is a cellular network transceiver.

65. The UE of claim 63, wherein the second wireless transceiver is the same as the first wireless transceiver.

66. The UE of claim 59, wherein:
the network entity is a serving base station of the UE,
the one or more network nodes are one or more base stations, and
the request is transmitted to the network entity via radio resource control (RRC) signaling, medium access control control element (MAC-CE) signaling, or uplink control information (UCI) signaling.

67. The UE of claim 59, wherein:
the network entity is a second UE in communication with the UE, the one or more network nodes are one or more UEs in communication with the UE, and the request is transmitted to the network entity via device-to-device (D2D) signaling.

68. The UE of claim 59, wherein the network entity is a sensing server in communication with the one or more network nodes.

69. A user equipment (UE), comprising:

means for performing a monostatic sensing operation to detect one or more characteristics of one or more objects in an environment of the UE;

means for transmitting, to a network entity, based on detection of the one or more characteristics of the one or more objects, a request for one or more network nodes to transmit one or more wireless sensing signals to assist the UE to perform one or more bistatic sensing operations; and means for performing the one or more bistatic sensing operations based on reception of the one or more wireless sensing signals to detect additional characteristics of the one or more objects.

70. A user equipment (UE), comprising:

means for performing a monostatic sensing operation to detect one or more characteristics of an environment of the UE, one or more objects in the environment of the UE, or both;

means for transmitting one or more parameters for one or more bistatic sensing operations to a network entity, the one or more parameters determined based, at least in part, on the one or more characteristics of the environment, the one or more objects, or both; and means for performing the one or more bistatic sensing operations based on reception of one or more wireless sensing signals transmitted by one or more network nodes, the one or more wireless sensing signals configured based on the one or more parameters.

71. A user equipment (UE), comprising:

means for performing a monostatic sensing operation to determine at least one direction of interest for one or more bistatic sensing operations;

means for transmitting, to a network entity, a request for one or more network nodes to transmit one or more wireless sensing signals based on the at least one direction of interest to assist the UE to perform the one or more bistatic sensing operations; and means for performing the one or more bistatic sensing operations based on reception of the one or more wireless sensing signals that are transmitted based on the at least one direction of interest.

72. A non-transitory computer-readable medium storing computer-executable instructions that, when executed by one or more processors of a user equipment (UE), cause the UE to:

perform a monostatic sensing operation to detect one or more characteristics of one or more objects in an environment of the UE;

transmit, to a network entity, based on detection of the one or more characteristics of the one or more objects, a request for one or more network nodes to transmit one or more wireless sensing signals to assist the UE to perform one or more bistatic sensing operations; and perform the one or more bistatic sensing operations based on reception of the one or more wireless sensing signals to detect additional characteristics of the one or more objects.

73. A non-transitory computer-readable medium storing computer-executable instructions that, when executed by one or more processors of a user equipment (UE), cause the UE to:

perform a monostatic sensing operation to detect one or more characteristics of an environment of the UE, one or more objects in the environment of the UE, or both;

transmit one or more parameters for one or more bistatic sensing operations to a network entity, the one or more parameters determined based, at least in part, on the one or more characteristics of the environment, the one or more objects, or both; and perform the one or more bistatic sensing operations based on reception of one or more wireless sensing signals transmitted by one or more network nodes, the one or more wireless sensing signals configured based on the one or more parameters.

74. A non-transitory computer-readable medium storing computer-executable instructions that, when executed by one or more processors of a user equipment (UE), cause the UE to:

perform a monostatic sensing operation to determine at least one direction of interest for one or more bistatic sensing operations;

transmit, to a network entity, a request for one or more network nodes to transmit one or more wireless sensing signals based on the at least one direction of interest to assist the UE to perform the one or more bistatic sensing operations; and perform the one or more bistatic sensing operations based on reception of the one or more wireless sensing signals that are transmitted based on the at least one direction of interest.

\* \* \* \* \*